US012266844B2

(12) United States Patent
Deuchst et al.

(10) Patent No.: US 12,266,844 B2
(45) Date of Patent: Apr. 1, 2025

(54) DIRECT RADIATING ARRAY ASSEMBLY OF AN ANTENNA

(71) Applicant: MacDonald, Dettwiler and Associates Corporation, Sainte-Anne-de-Bellevue (CA)

(72) Inventors: Guillaume Deuchst, Sainte-Anne-de-Bellevue (CA); Benjamin Huneault, Sainte-Anne-de-Bellevue (CA); Billy Marquez, Laval (CA); Yann Van der Bruggen, Sainte-Anne-de-Bellevue (CA); Stephen Wilson, Pointe Claire (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 297 days.

(21) Appl. No.: 17/765,331

(22) PCT Filed: Sep. 30, 2020

(86) PCT No.: PCT/CA2020/051310
§ 371 (c)(1),
(2) Date: Mar. 30, 2022

(87) PCT Pub. No.: WO2021/062540
PCT Pub. Date: Apr. 8, 2021

(65) Prior Publication Data
US 2022/0376403 A1    Nov. 24, 2022

Related U.S. Application Data

(60) Provisional application No. 62/908,242, filed on Sep. 30, 2019.

(51) Int. Cl.
*H01Q 1/02*    (2006.01)
*H01Q 1/28*    (2006.01)
(Continued)

(52) U.S. Cl.
CPC ............... *H01Q 1/02* (2013.01); *H01Q 1/288* (2013.01); *H01Q 21/0025* (2013.01); *H01Q 23/00* (2013.01)

(58) Field of Classification Search
CPC ............ H01Q 1/02; H01Q 1/288; H01Q 3/34; H01Q 3/40; H01Q 21/0025; H01Q 23/00; Y02D 30/70; H04B 7/1851
See application file for complete search history.

(56) References Cited

U.S. PATENT DOCUMENTS

| 5,576,721 A | 11/1996 | Hwang et al. |
| 9,172,145 B2 | 10/2015 | Puzella et al. |

(Continued)

FOREIGN PATENT DOCUMENTS

| CA | 2694008 A1 | 1/2009 |
| JP | H11317618 A | 11/1999 |

(Continued)

OTHER PUBLICATIONS

CIPO AS ISA, International Search Report and Written Opinion for PCT/CA2020/05110, Jan. 4, 2021.

(Continued)

*Primary Examiner* — Robert Karacsony
(74) *Attorney, Agent, or Firm* — Own Innovation; Kent C. Howe; James W. Hinton

(57) ABSTRACT

Increasing demand for communications systems for facilitating communications such as communications satellites leads to continuously increasing frequency bands of the signal for communication and the quantity of beams carrying the signals may make it more and more difficult to have a significant number of mechanical and electrical components concentrated in a location in proximity to the array while maintaining antenna efficiency. Provided is a direct radiating array ("DRA") antenna for transmitting or receiving an electromagnetic radio frequency ("RF") signal of at least one predetermined signal frequency band and a method of assembly that overcomes at least some of the disadvantages of existing direct radiating array systems and methods. The DRA antenna comprising a plurality of radiating elements, a plurality of RF signal chain paths and a beamforming network board having a plurality of electrical ports for electrically connecting to the plurality of RF signal chain paths.

19 Claims, 20 Drawing Sheets

(51) Int. Cl.
*H01Q 21/00* (2006.01)
*H01Q 23/00* (2006.01)

(56) References Cited

U.S. PATENT DOCUMENTS

| 2017/0054208 | A1 | 9/2017 | Pietila et al. |
| 2018/0123225 | A1 | 5/2018 | Tran |
| 2019/0260110 | A1 | 8/2019 | Thai et al. |

FOREIGN PATENT DOCUMENTS

| JP | 2010514373 | A | 4/2010 |
| JP | 2014047979 | A | 3/2014 |
| JP | 2016506108 | A | 2/2016 |
| JP | 2019066104 | A | 4/2019 |
| WO | 2014080240 | A1 | 5/2014 |
| WO | 2018119153 | A2 | 6/2018 |

OTHER PUBLICATIONS

Dawkins, A.W.J. et al., Development of Direct Radiating Arrays for Future KU Band Telecom Applications; European Conference on Antennas and Propagation: EUCAP 2007; Nov. 11-16, 2007, EICC, Edinburgh, UK, Jan. 1, 2007 (Jan. 1, 2007), pp. 569-569, XP055913663.

Extended European Search Report as issued on corresponding European Patent Application No. 20872027.6, dated Oct. 16, 2023.

Meniconi Erika et al., 3D Integration Technologies for a Planar Dual Band Active Array in Ka-Band, 2013 European Microwave Conference, European Microwave Association, Oct. 6, 2013 (Oct. 6, 2013), pp. 215-218, XP032535797, Nuremberg, Germany.

Japanese Notification of Reason(s) for Refusal, issued on Japanese Patent Application No. 2022-520080 on Sep. 3, 2024.

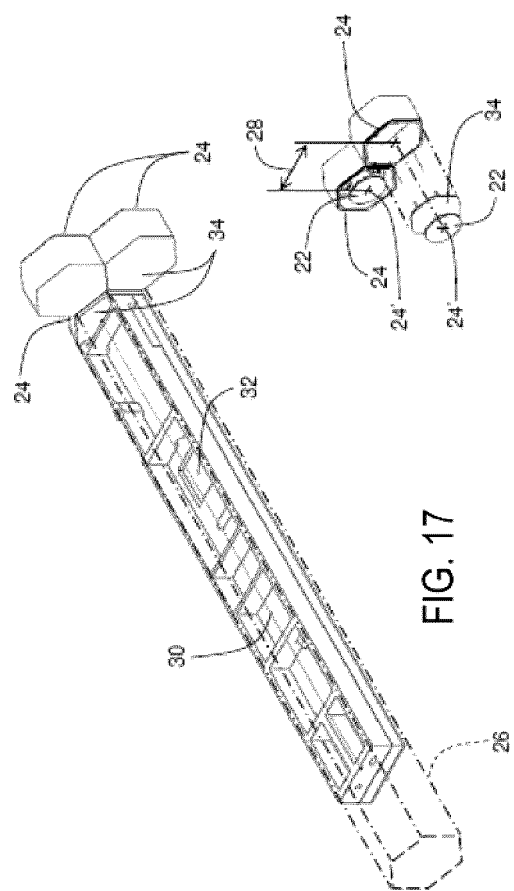

DIRECT RADIATING ARRAY ASSEMBLY OF AN ANTENNA

TECHNICAL FIELD

The following relates generally to antennas and antenna assemblies for radio frequency (RF) communication, and more particularly to direct radiating array antennas.

INTRODUCTION

As the number of connected devices and the need for communication between them continues to increase, along with the generation and proliferation of data generated by such devices, so too does demand for communications systems for facilitating such communication. One such manner of facilitating communication is with communications satellites. The market for communications satellites is set to explode as it becomes easier to launch satellites into space and the demand for satellite-based communication increases.

Communications satellites facilitate communications through onboard antennas. One such example of an antenna is an active direct radiating array antenna. It is important for such antennas to manage and balance size, mass, and power. It is often desired to have an antenna that may provide any one or more of reduced size, reduced mass, or reduced power consumption, or that may provide performance trade-offs while effectively managing the size, mass, and power of the antenna. For example, in spaceborne applications, the allocated overall weight for an antenna may be constrained, thereby limiting the number of radiating elements and the electrical efficiency of the antenna.

Continuously increasing frequency bands of the signal for communication and the quantity of beams carrying the signals may make it more and more difficult to have a significant number of mechanical and electrical components concentrated in a location in proximity to the array while maintaining antenna efficiency especially for Low Earth Orbit applications. LEO makes the DRA scan requirement larger, which then makes the elements spacing narrower (i.e. spacing between radiating elements). LEO is therefore much more challenging than GEO or MEO in terms of mechanical and electrical components concentrated in close proximity. To reduce signal losses through different components, such components may need to be positioned as close as possible to the array to limit signal path length as much as possible.

There is also a need to effectively manage heat generated by components of the antenna, such as signal amplifiers, to avoid temperature increases that may reduce overall antenna efficiency. Structures for dissipating the heat generated by antenna components may thus be desired. Such structures can, however, complicate the overall integration of the antenna. As a result, the weight of antennas such as direct radiating arrays can be significant, which may in turn negatively impact the electrical performance of the antenna.

Structural requirements of the antenna (e.g. radiating elements, signal amplification paths, structures for dissipating heat) can be significant and can require a significant physical volume, which may increase the weight of the antenna and reduce available space on a spacecraft. In spaceborne applications, the allocated overall weight for an antenna may be limited, which can limit the number of radiating elements and reduce electrical efficiency of the antenna.

Accordingly, there is a need for an improved direct radiating array antenna and method of assembly that overcomes at least some of the disadvantages of existing direct radiating array systems and methods.

SUMMARY

A direct radiating array ("DRA") antenna for transmitting or receiving an electromagnetic radio frequency ("RF") signal of at least one predetermined signal frequency band is provided. The DRA antenna includes: a plurality of radiating elements defining a radiating surface of the DRA antenna; a plurality of RF signal chain paths, each of the plurality of RF signal chain paths coupled to a respective one of the plurality of radiating elements and configured to amplify an RF signal either received by or to be transmitted by the respective one of the radiating elements; and a single beamforming network board having a plurality of electrical ports for electrically connecting to the plurality of RF signal chain paths.

Each of the plurality of RF signal chain paths may include a heat generating component, and the DRA antenna may further include a heat spreader adapted to passively cool the DRA antenna by transferring heat generated by the heat generating component of the RF signal chain path to a heat sink.

Each of the plurality of RF signal chain paths may include a heat generating component, and the DRA antenna may further include a plurality of thermal blades for passively transferring heat generated by the heat generating component mounted thereto.

Each of the plurality of thermal blades may include a top surface which acts as a thermal exchange interface for the DRA.

Each of the plurality of thermal blades may include a heat pipe adapted to actively or passively transfer heat.

The heat pipe may be an oscillating heat pipe adapted to passively transfer heat.

Each of the plurality of thermal blades may be a solid metallic thermal blade adapted to passively transfer heat.

The DRA antenna may further include a plurality of radiating element modules, wherein each respective one of the plurality of radiating element modules includes a subset of the plurality of radiating elements and a subset of the plurality of RF signal chain paths, wherein the subset of the plurality of radiating elements defines a collective radiating element footprint, and wherein the subset of the plurality of RF signal chain paths is contained within the collective radiating element footprint.

The DRA antenna may further include plurality of system-in-package ("SIP") modules each including at least one beamforming integrated circuit ("BFIC"). The SIP modules may be mounted to the beamforming network board in a planar configuration.

A first subset of the plurality of SIP modules may be mounted to a first surface of the beamforming network board and a second subset of the plurality of SIP modules may be mounted to a second surface of the beamforming network board, the first and second surfaces opposing one another.

The plurality of SIP modules may be mounted to the beamforming network board as a plurality of double stacks, each double stack including a first SIP module mounted to a first surface of the beamforming network board and a second SIP module mounted to a second surface of the beamforming network board opposing the first surface, the first and second SIP modules connected to one another.

Each double stack may be thermally coupled to a thermal blade adapted to passively transfer heat. The thermal coupling may be indirect. The indirect thermal coupling may be through a baseplate to which the thermal blade is mounted.

Each of the first subset of the SIP modules may be configured to dissipate heat generated by itself and at least one of the second subset of the SIP modules.

Each of the first subset of the SIP modules may be thermally coupled to a thermal blade adapted to passively transfer heat.

The beamforming network board may be mounted to a baseplate, and each double stack may be thermally coupled to the baseplate for transferring heat from a heat generating component of the double stack to a thermal blade adapted to passively transfer heat.

At least a subset of the plurality of SIP modules may each comprise a cover which acts as a thermal exchange interface for heat generated by a heat generating component of the SIP module.

At least a subset of the plurality of SIP modules may each comprise a cover for contacting a baseplate of the DRA antenna and for transferring heat generated by a heat generating component of the SIP module to the baseplate.

Each RF signal chain path may be connected to the beamforming network board via a spring-loaded electrical connector.

The DRA antenna may further include a plurality of system-in-package ("SIP") modules mounted to the beamforming network board, each SIP module including at least one beamforming integrated circuit ("BFIC") and a spring-loaded electrical connector for electrically connecting the SIP module to the beamforming network board.

The beamforming network board may define a first plane and the plurality of RF signal chain paths may be arranged in a second plane that is substantially perpendicular to the first plane.

The DRA may further comprise a plurality of thermal blades mounted substantially perpendicular to the beamforming network board, the plurality of RF signal chain paths mounted to the plurality of thermal blades.

A satellite is also provided that includes the above described DRA. The satellite may be a low-earth orbit satellite.

A satellite is also provided. The satellite includes a spacecraft bus, the above-described DRA antenna mounted on the spacecraft bus, and an onboard processor ("OBP") communicatively connected to the DRA antenna, the OBP for processing a beam signal provided to or received from the beamforming network board.

A satellite is also provided including a spacecraft bus and the above-described DRA antenna mounted on the spacecraft bus.

A method of operating the above-described DRA antenna is also provided. The method includes sending or receiving an RF signal of the at least one predetermined frequency band using the DRA antenna.

A direct radiating array ("DRA") antenna for transmitting or receiving an electromagnetic RF signal of at least one predetermined signal frequency band is also provided. The DRA antenna includes: a plurality of radiating element modules, each of the plurality of radiating element modules comprising: a plurality of radiating elements defining at least a portion of a radiating surface of the DRA antenna; and a plurality of RF signal chain paths, each of the plurality of RF signal chain paths coupled to a respective one of the plurality of radiating elements and configured to amplify an RF signal either received by or to be transmitted by the radiating element to which the RF signal chain path is coupled. The plurality of radiating elements define a collective element footprint, and the plurality of RF signal chain paths are contained within the collective element footprint.

The DRA antenna may further include a plurality of heat spreaders, wherein each of the plurality of RF signal chain paths includes a heat generating component mounted to a respective one of the plurality of heat spreaders for passively transferring heat generated by the heat generating component to the heat spreader.

The DRA antenna may further include a single beamforming network board for implementing a beamforming network, the beamforming network board having a plurality of electrical ports for electrically connecting to the plurality of RF signal chain paths.

The beamforming network board may carry all RF and electrical signals and DC power to the plurality of RF signal chain paths of the DRA antenna.

The plurality of radiating elements and the plurality of RF signal chain paths may be assembled into radiating element modules, wherein each radiating element module includes a subset of the plurality of radiating elements and the RF signal chains paths coupled thereto, and wherein the subset of radiating elements are arranged in a linear configuration.

The DRA antenna may further include a single beamforming network board for implementing a beamforming network, the beamforming network board having a plurality of electrical ports for electrically connecting to the plurality of RF signal chain paths, wherein the radiating element modules are arranged substantially perpendicular to the beamforming network board.

The DRA antenna may further include a plurality of thermal blades, wherein the radiating element modules are mounted to the thermal blades such that heat generated by a heat generating component of each RF signal chain path is passively transferred to a respective one of the plurality of thermal blades.

The radiating element modules may be mounted to the plurality of thermal blades such that at least one thermal blade has at least one radiating element module mounted to a first surface of the thermal blade and at least one radiating element module mounted to a second surface of the thermal blade opposing the first surface.

The RF signal chain path may include a either a driver before a high power amplification stage in a transmit DRA antenna or a gain block a low noise amplification stage in a receive DRA antenna.

Each of the plurality of RF signal chain paths may be electrically connected to a beamforming network board via a spring loaded electrical connector.

The plurality of heat spreaders may be thermal blades. Each thermal blade may include a heat pipe.

The heat pipe may be an oscillating heat pipe.

The DRA antenna may further include a plurality of system-in-package ("SIP") modules mounted to the beamforming network board, each SIP module including a beamforming integrated circuit and a spring loaded electrical connector for electrically connecting to the beamforming network board.

The DRA antenna may further include a plurality of system-in-package ("SIP") modules each including at least one beamforming integrated circuit ("BFIC"), the SIP modules mounted to a beamforming network board in a planar configuration.

A first subset of the plurality of SIP modules may be mounted to a first surface of the beamforming network board and a second subset of the plurality of SIP modules is mounted to a second surface of the beamforming network board, the first and second surfaces opposing one another.

The plurality of SIP modules may be mounted to the beamforming network board as a plurality of double stacks, each double stack including a first SIP module mounted to a first surface of the beamforming network board and a second SIP module mounted to a second surface of the beamforming network board opposing the first surface, the first and second SIP modules connected to one another.

Each double stack may be thermally coupled to a thermal blade adapted to passively transfer heat.

The beamforming network board may be mounted to a baseplate, and each double stack may be thermally coupled to the baseplate for transferring heat from a heat generating component of the double stack to a thermal blade adapted to passively transfer heat.

At least a subset of the plurality of SIP modules may each comprise a cover which acts as a thermal exchange interface for heat generated by a heat generating component of the SIP module.

At least a subset of the plurality of SIP modules may each comprise a cover for contacting a baseplate of the DRA antenna and for transferring heat generated by a heat generating component of the SIP module to the baseplate.

A satellite is also provided that includes the above-described DRA antenna. The satellite may be a low-earth orbit satellite.

A satellite is also provided including a spacecraft bus and the above-described DRA antenna mounted on the spacecraft bus.

A method of operating the above-described DRA antenna is also provided. The method includes sending or receiving an RF signal of the at least one predetermined frequency band using the DRA antenna.

A satellite is also provided including a spacecraft bus, an onboard processor, and a direct radiating array antenna connected to the onboard processor and mounted on the spacecraft bus. The DRA antenna includes: a plurality of radiating elements defining a radiating surface of the DRA antenna; a plurality of RF signal chain paths, each of the plurality of RF signal chain paths coupled to a respective one of the plurality of radiating elements and configured to amplify an RF signal either received by or to be transmitted by the respective one of the radiating elements; and a single beamforming network board having a plurality of electrical ports for electrically connecting to the plurality of RF signal chain paths.

The satellite may further include a passive heat management subsystem for managing heat generated by the DRA antenna, the passive heat management subsystem including a plurality of thermal blades connected to a heat sink, the thermal blades for actively or passively transferring heat generated by a heat generating component of the DRA antenna to the heat sink.

The satellite may be a low-earth orbit satellite.

The satellite may further include a positioning subsystem configured to control an orbit of the satellite. The orbit may be a low-earth orbit.

A satellite is also provided including comprising a spacecraft bus, an onboard processor, and a direct radiating array antenna connected to the onboard processor and mounted on the spacecraft bus. The DRA antenna includes a plurality of radiating element modules, each of the plurality of radiating element modules comprising: a plurality of radiating elements defining at least a portion of a radiating surface of the DRA antenna; and a plurality of RF signal chain paths, each of the plurality of RF signal chain paths coupled to a respective one of the plurality of radiating elements and configured to amplify an RF signal either received by or to be transmitted by the radiating element to which the RF signal chain path is coupled. The plurality of radiating elements define a collective element footprint, and the plurality of RF signal chain paths are contained within the collective element footprint.

The satellite may further include a passive heat management subsystem for managing heat generated by the DRA antenna, the passive heat management subsystem including a plurality of thermal blades connected to a heat sink, the thermal blades for actively or passively transferring heat generated by a heat generating component of the DRA antenna to the heat sink.

The satellite may be a low-earth orbit satellite.

The satellite may further include a positioning subsystem configured to control an orbit of the satellite, the orbit being a low-earth orbit.

Also provided is a direct radiating array ("DRA") antenna for transmitting or receiving an electromagnetic radio frequency ("RF") signal of at least one predetermined signal frequency band, the DRA antenna comprising a single beamforming network board.

The DRA antenna may further include a plurality of RF signal chains, and the beamforming network board may carry all RF and electrical signals and DC power to the RF signal chains.

A method of assembling a direct radiating array ("DRA") antenna is also provided. The method includes: forming a first assembled thermal blade by mounting a first plurality of radiating element modules onto a first thermal blade, the first thermal blade configured to actively or passively transfer heat; mounting a beamforming network board onto a baseplate; and mounting the first assembled thermal blade to the baseplate such that the first assembled thermal blade is substantially perpendicular to the beamforming network board, wherein the mounting includes forming an electrical connection between an electrical connector of each of the first plurality of radiating element modules and a corresponding receiving port of the beamforming network board.

The first thermal blade and the first plurality of radiating element modules may be arranged substantially perpendicular to the beamforming network board.

The first assembled thermal blade may include at least one radiating element module mounted to a first surface of the first thermal blade and at least one radiating element module mounted to a second surface of the first thermal blade, the first surface and the second surface opposing one another.

The method may further include: forming a second assembled thermal blade by mounting a second plurality of radiating elements onto a second thermal blade, the second thermal blade configured to actively or passively transfer heat; and mounting the second assembled thermal blade to the baseplate and the beamforming network board such that the second assembled thermal blade is substantially perpendicular to the beamforming network board and substantially parallel to the first assembled thermal blade, wherein the mounting includes forming an electrical connection between an electrical connector of each of the second plurality of radiating element modules and a corresponding receiving port of the beamforming network board.

The second thermal blade may be the same size as the first thermal blade.

The electrical connector may be a spring-loaded electrical connector.

Each of the first plurality of radiating element modules may include a plurality of radiating elements and a plurality of radio frequency ("RF") signal chain paths, each respective one of the plurality of RF signal chain paths coupled to a respective one of the plurality of radiating elements, wherein the plurality of radiating elements define a collective radiating element footprint, and wherein the plurality of RF signal chain paths are contained within the collective radiating element footprint.

The plurality of RF signal chain paths may be contained entirely within the collective radiating element footprint.

The first plurality of radiating elements may be centrally mounted on the first thermal blade.

Each respective one of the first plurality of radiating element modules may include: a plurality of radiating elements arranged in a linear configuration, wherein each respective one of the plurality of radiating elements is attached to at least one other of the plurality of radiating elements; a plurality of RF signal chain paths, each RF signal chain path coupled to one of the plurality of radiating elements and for amplifying a signal provided to or received from the radiating element coupled thereto; and the electrical connector coupled to each of the plurality of RF signal chain paths.

The electrical connector may be a spring loaded electrical connector.

The spring-loaded electrical connector may provide a DC and an RF interface to the beamforming network board.

The first thermal blade may include a top surface which acts as an external thermal interface for the DRA antenna.

The first thermal blade may include an oscillating heat pipe.

Forming the first assembled thermal blade may further include: mounting a beam amplifier module ("BAM") to the first thermal blade; and forming an electrical connection between an electrical connector of the BAM and a corresponding receiving port of the beamforming network board.

The electrical connector may be a spring loaded electrical connector.

The method may further include mounting a first plurality of system-in-package ("SIP") modules to a first surface of the beamforming network board, each respective one of the first plurality of SIP modules including at least one beamforming integrated circuit.

The method may further include mounting a second plurality of SIP modules to a second surface of the beamforming network board, each respective one of the second plurality of SIP modules including a beamforming integrated circuit, wherein the first and second surfaces are opposing surfaces.

The first plurality of SIP modules may be thermally coupled to the baseplate to conduct heat from a heat generating component of each of the first plurality of SIP modules to the first thermal blade.

The baseplate may couple the heat to the first thermal blade.

A direct radiating array ("DRA") antenna for transmitting or receiving an electromagnetic RF signal of at least one predetermined signal frequency band is also provided. The DRA antenna includes, the DRA antenna includes: a single beamforming network board; and a plurality of system-in-package ("SIP") modules each including a beamforming integrated circuit ("BFIC"), the SIP modules mounted to the beamforming network board in a planar configuration.

A direct radiating array ("DRA") antenna for transmitting or receiving an electromagnetic RF signal of at least one predetermined signal frequency band is also provided. The DRA antenna includes a single beamforming network board; and a plurality of system-in-package ("SIP") modules, each including at least one beamforming integrated circuit ("BFIC"), the SIP modules mounted to the beamforming network board in a planar configuration and electrically connected to the beamforming network board via spring loaded electrical connectors.

A direct radiating array ("DRA") antenna for transmitting or receiving an electromagnetic RF signal of at least one predetermined signal frequency band is also provided The DRA antenna includes: a beamforming network board; and a plurality of system-in-package ("SIP") modules each including a beamforming integrated circuit ("BFIC"); wherein each SIP module includes a spring loaded electrical connector for electrically connecting to the beamforming network board.

A direct radiating array ("DRA") antenna for transmitting or receiving an electromagnetic RF signal of at least one predetermined signal frequency band is also provided. The DRA antenna includes a plurality of radiating element modules, each of the plurality of radiating element modules including: a radiating element, the radiating element defining a portion of a radiating surface of the DRA antenna; an RF signal chain path coupled to the radiating element and configured to amplify an RF signal either received by or to be transmitted by the radiating element; and a spring loaded electrical connector for electrically connecting the RF signal chain path to a beamforming network board of the DRA antenna.

A direct radiating array ("DRA") antenna for transmitting or receiving an electromagnetic RF signal of at least one predetermined signal frequency band is also provided. The DRA antenna includes: a plurality of radiating element modules, each of the plurality of radiating element modules including: a plurality of radiating elements, the plurality of radiating elements defining a portion of a radiating surface of the DRA antenna; a plurality of RF signal chain paths, each respective one of the plurality of RF signal chain paths coupled to a respective one of the plurality of radiating elements and configured to amplify an RF signal either received by or to be transmitted by the respective one of the plurality of radiating elements; and wherein the plurality of radiating elements define a collective radiating element footprint, and wherein the plurality of RF signal chain paths are contained within the collective radiating element footprint.

A direct radiating array ("DRA") antenna for transmitting or receiving an electromagnetic RF signal of at least one predetermined signal frequency band is also provided. The DRA antenna includes: a beamforming network board; and a plurality of radiating element modules, each radiating element comprising: a radiating element, the radiating element defining a portion or a radiating surface of the DRA antenna; an RF signal chain path coupled to the radiating element and configured to amplify an RF signal either received by or to be transmitted by the radiating element; and wherein the RF signal chain path is arranged substantially perpendicular to the beamforming network board.

A direct radiating array ("DRA") antenna for transmitting or receiving an electromagnetic RF signal of at least one predetermined signal frequency band is also provided. The DRA antenna includes: a beamforming network board; and an RF signal chain path arranged substantially perpendicular to the beamforming network board.

A direct radiating array ("DRA") antenna for transmitting or receiving an electromagnetic RF signal of at least one predetermined signal frequency band is also provided. The DRA antenna includes a beamforming network board defining a first plane and a plurality of RF signal chain paths arranged in a second plane, wherein the second plane is substantially perpendicular to the first plane.

A direct radiating array ("DRA") antenna for transmitting or receiving an electromagnetic RF signal of at least one predetermined signal frequency band is also provided. The DRA antenna includes: a beamforming network board; a plurality of thermal blades; a plurality of RF signal chain paths each for amplifying an RF signal received by or to be transmitted by a connected radiating element and each mounted to a respective one of the plurality of thermal blades; wherein the plurality of thermal blades are arranged substantially perpendicular to the beamforming network board.

A direct radiating array ("DRA") antenna for transmitting or receiving an electromagnetic RF signal of at least one predetermined signal frequency band is also provided. The DRA antenna includes: a beamforming network board; and a plurality of thermal blades, each of the plurality of thermal blades adapted to passively transfer heat from a heat generating component of the DRA antenna to a heat sink using an oscillating heat pipe.

A direct radiating array ("DRA") antenna for transmitting or receiving an electromagnetic RF signal of at least one predetermined signal frequency band is also provided. The DRA antenna includes: a beamforming network board; and a plurality of thermal blades adapted to passively cool the DRA antenna by transferring heat generated by a heat generating component of the DRA antenna to a heat sink.

A direct radiating array ("DRA") antenna for transmitting or receiving an electromagnetic RF signal of at least one predetermined signal frequency band is also provided. The DRA antenna includes: a single beamforming network board; a plurality of radiating element modules comprising a plurality of radiating elements and a plurality of RF signal chain paths, each of the plurality of RF signal chain paths coupled to a respective one of the plurality of radiating elements and configured to amplify an RF signal either received by or to be transmitted by the respective one of the plurality of radiating elements; wherein the plurality of RF signal chain paths are contained within a collective element footprint of the radiating element module defined by the plurality of radiating elements; and wherein the plurality of RF signal chain paths are arranged substantially perpendicular to the beamforming network board.

A direct radiating array ("DRA") antenna for transmitting or receiving an electromagnetic RF signal of at least one predetermined signal frequency band is also provided. The DRA antenna includes: a beamforming network board; and a first SIP module and a second SIP module each including at least one beamforming integrated circuit, the first and second SIP modules mounted to opposing surfaces of the beamforming network board and connected to one another such that the first SIP module provides a thermal exchange interface for the second SIP module.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 17 is an enlarged broken bottom perspective view of a group of three (3) radiating elements, showing the amplifier unit of the signal RF chain path located under the footprint of one of the radiating elements; and FIG. 18 is an exploded enlarged top perspective view of two (2) radiating elements, showing one exploded radiating element with the RF connection.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The following relates generally to antenna-based communication systems, and more particularly to direct radiating array ("DRA") antennas. The DRA of the present disclosure may be more compact that existing DRAs. This may advantageously reduce size, cost, and/or mass, which can be a significant factor in implementing the DRA in space-based applications. Further, the compact design of the DRA may bring active, heat generating components into a more concentrated area, making thermal management of the generated heat an important feature. The DRA of the present disclosure provides an approach to managing such thermal affects to keep component temperatures within acceptable ranges.

In a particular embodiment of the present disclosure, the DRA described herein may be used on a satellite in low earth orbit ("LEO"). LEO may make the DRA scan requirement larger, which then makes element spacing of the DRA narrower (element spacing referring to the spacing between radiating elements in the radiating element active lattice, as illustrated and described herein). The narrower element spacing requirements for DRAs used in LEO can make LEO applications much more challenging than geostationary orbit or medium earth orbit in terms of mechanical and electrical components concentrated in close proximity. The DRA of the present disclosure incorporates various design features which address such challenges of LEO DRA applications. Accordingly, the DRA of the present disclosure may be particularly well suited to use on satellites in LEO by addressing issues associated with bringing mechanical and electrical components of the DRA in close proximity.

The present disclosure describes DRA antennas including active radiating elements (i.e. radiating element having an RF signal path and amplification). It is to be understood that, in some embodiments, the DRA antennas described herein may include one or more passive radiating elements in addition to the one or more active radiating elements (even though such one or more passive radiating elements may not be shown or described). Accordingly, the present disclosure contemplates embodiments of the DRA antennas described herein that include only active radiating elements and that include some combination of one or more active radiating elements and one or more passive radiating elements, and that the absence of any reference to any passive radiating elements is not meant to preclude the possibility of their inclusion or use in the DRA antenna.

Figure 1:
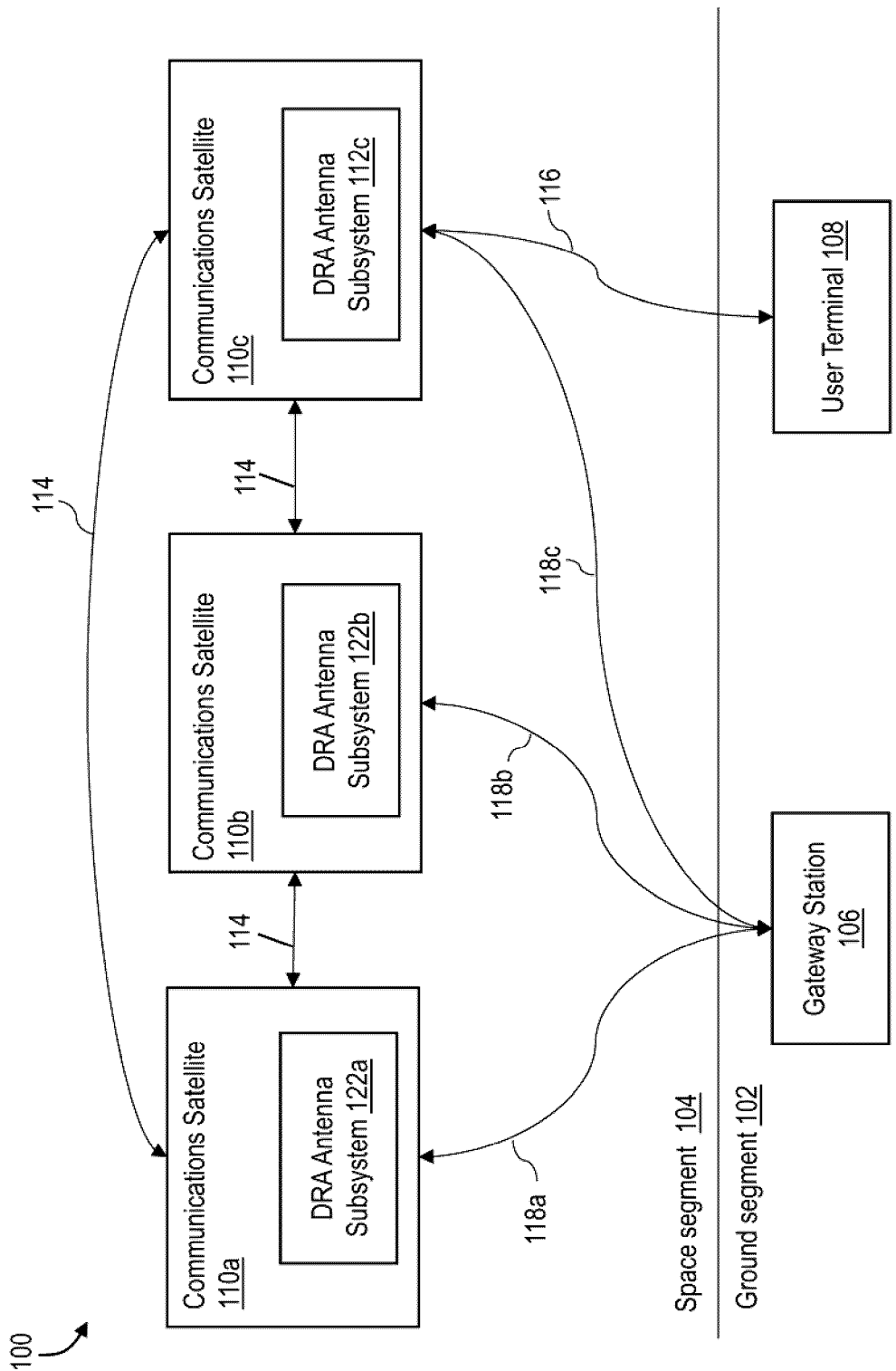
FIG. 1 is a block diagram of a satellite communication system including a plurality of satellites each having a direct radiating array (DRA) antenna subsystem, according to an embodiment.

Referring now to FIG. 1, shown therein is a system 100 for satellite-based communication, according to an embodiment.

The system 100 includes a ground segment 102 and a space segment 104.

The space segment 104 of system 100 includes communications satellites 110a, 110b, and 110c. Communications satellites 110a, 110b, 110c are referred to herein collectively as communication satellites 110 and generically as communication satellite 110.

It is to be understood that the system 100 may include any number of communication satellites 110 (i.e. one or more). In a particular embodiment, the satellite 110 is a low-earth orbit (LEO) satellite. In other variations, the satellite 110 may be a medium-earth orbit (MEO) satellite or a geostationary orbit (GEO) satellite. In embodiments of the system 100 including a plurality of satellites 110, the satellites 110 may be referred to collectively as a satellite constellation or satellite network.

The communications satellites 110a, 110b, 110c each include a direct radiating array (DRA) antenna subsystem (DRA subsystems 112a, 112b, 112c, respectively). DRA antenna subsystems 112a, 112b, 112c are referred to herein collectively as DRA antenna subsystems 112 and generically as DRA antenna subsystem 112. The DRA antenna subsystem 112 may be configured to perform RF transmission, RF reception, or both.

In an embodiment, the DRA antenna subsystem 112 may operate in the Ku band or Ka band.

The DRA subsystem 112 includes a direct radiating array antenna. The direct radiating array antenna may be an active array (e.g. containing DC powered circuit, amplifiers, beamforming integrated circuits, etc.). The direct radiating array antenna is configured to perform analog beamforming.

Communications satellites 110a, 110b, and 110c communicate with one another via inter-satellite communication links 114.

The ground segment 102 includes a gateway earth station ("GES") 106 (or gateway station 106). The system 100 may include a plurality of gateway stations 106, which may be positioned at different locations. The gateway station 106 may be located on the surface of the Earth, in the atmosphere, or in space. The gateway station 106 may be fixed or mobile.

The gateway station 106, which may be surface-based or atmosphere-based, includes one or more devices configured to provide real-time communication with satellites 110.

The communications satellites 110a, 110b, 110c communicate with the ground station 106 via communication links 118a, 118b, 118c, respectively.

The gateway station 106 is configured to establish a telecommunications link 118 with a satellite 110 when the satellite 110 is in "view" of the gateway station 106. The gateway station 106 transmits and/or receives radio ("RF") waves to and/or from the satellite 110. The gateway station 106 may include a parabolic antenna for transmitting and receiving the RF signals. The gateway station 106 may have a fixed or itinerant position.

The gateway station 106 sends radio signals to the satellite 110 (uplink) via communication link 118 and receives data transmissions from the satellite (downlink) via the communication link 118.

The gateway station 106 may serve as a command and control center for a satellite network (or "satellite constellation").

The gateway station 106 may analyze data received from the satellites 110 and/or may relay the received data to another location (i.e. another computer system, such as another gateway station 106) for analysis. In some cases, the gateway station 106 may receive data from the satellite 110 and transmit the received data to a computing device specially configured to perform processing and analysis on the received satellite data.

The gateway station 106 may further be configured to receive data from the satellite 110 and monitor navigation or positioning of the satellite 110 (e.g. altitude, movement) or monitor functioning of the satellite's critical systems (e.g. by analyzing data from the critical system being monitored).

The gateway station 106 may include any one or more of the following elements: a system clock, antenna system, transmitting and receiving RF equipment, telemetry, tracking and command (TT&C) equipment, data-user interface, mission data recovery, and station control center.

The ground segment 102 of system 100 also includes a user terminal 108.

The user terminal 108 may be a fixed or mobile terminal. The user terminal 108 may be any device capable of transmitting and/or receiving RF communication signals. The user terminal 108 includes an RF communication module for transmitting and/or receiving the RF signals. The user terminal 108 may be, for example, a computing device, such as a laptop or desktop, or a mobile device (e.g. smartphone).

The communications satellite 110c communicates with the user terminal 108 via communications link 116. Communications performed by satellite 110c via communications link 116 may include transmission and reception. While FIG. 1 shows communication link 116 established between the satellite 110c and the user terminal 108, it is to be understood that the user terminal 108 may establish a similar communication link with satellite 110a or 110b. Similarly, the communications satellite 110c may establish similar communication links with other user terminals.

Figure 2:
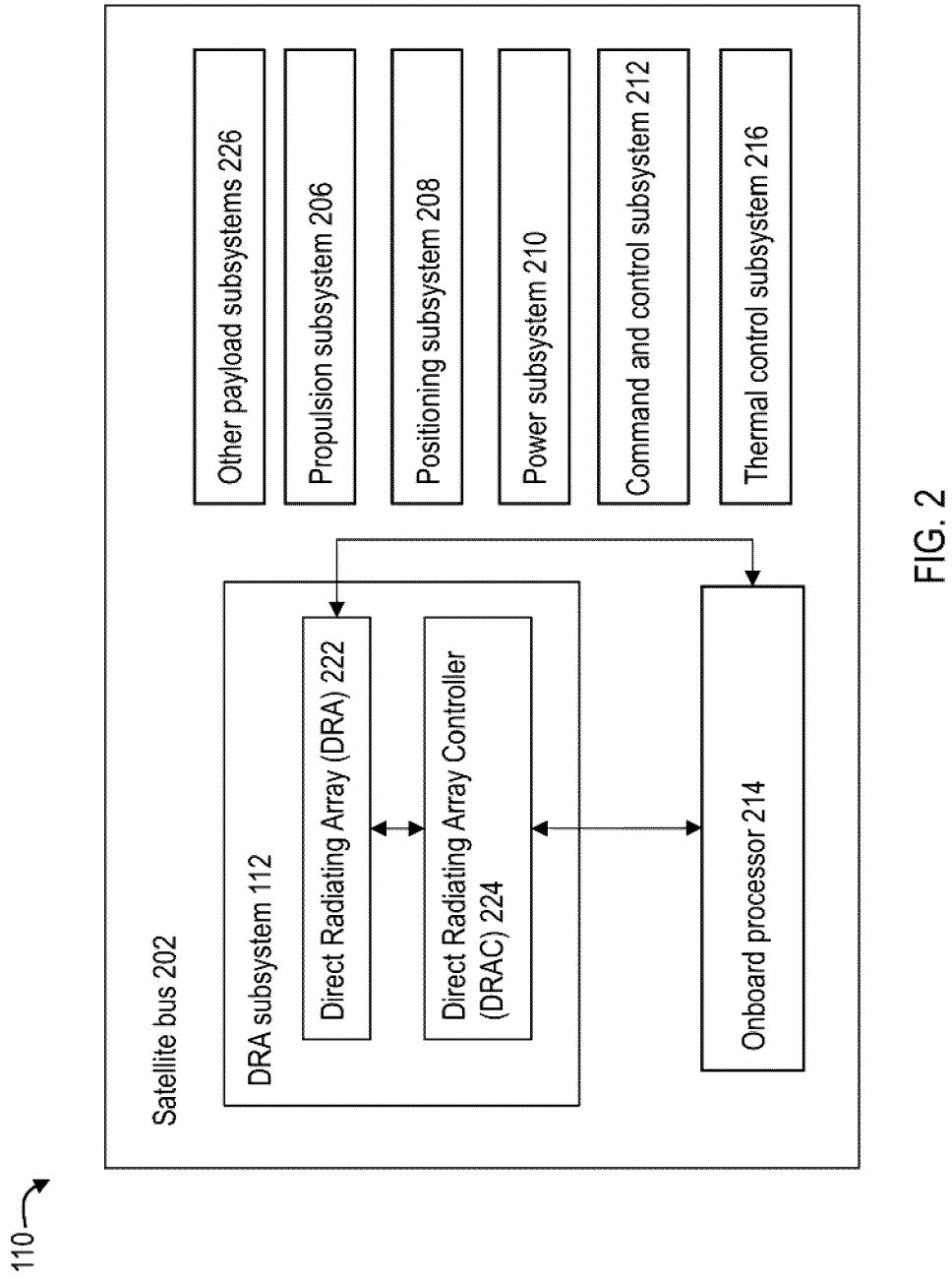
FIG. 2 is a block diagram of a communications satellite of FIG. 1, according to an embodiment.

Referring now to FIG. 2, shown therein is a communications satellite 110 of FIG. 1, according to an embodiment.

The communications satellite 110 includes a satellite bus 202. The satellite bus 202 provides the body of the satellite 110. The satellite bus 202 provides structural support and an infrastructure of the satellite 110 as well as locations for a payload (e.g. various subsystems, such as the DRA subsystem 112). Components of the communications satellite 110 may be housed within an interior of the satellite bus 202 or may be connected to an external surface of the satellite bus 202 (directly or indirectly through another component).

The communications satellite 110 includes a propulsion subsystem 206 for driving the communications satellite 110. The propulsion subsystem 206 adjusts the orbit of the satellite 110. The propulsion subsystem 206 includes one or more actuators, such as reaction wheels or thrusters. The propulsion subsystem 206 may include one or more engines to produce thrust.

The communications satellite 110 includes a positioning subsystem 208. The positioning subsystem 208 uses specialized sensors to acquire sensor data (e.g. measuring orientation) which can be used by a processing unit of the positioning subsystem 208 to determine a position of the satellite 110. The positioning subsystem 208 controls attitude and orbit of the satellite 110. The positioning subsystem 208 communicates with the propulsion subsystem 208.

Together, the positioning subsystem 208 and the propulsion subsystem 206 determine and apply the torques and forces needed to re-orient the satellite 110 to a desired attitude, keep the satellite 110 in the correct orbital position, and keep antennas (e.g. the direct radiating array 222) pointed in the correct direction.

The communications satellite 110 includes an electrical power subsystem 210. The electrical power subsystem 210 provides power for the DRA subsystem 112, as well as for other components. The power may be provided through the use of solar panels on the satellite bus 202 that convert solar radiation into electrical current. The power subsystem 210 may also include batteries for storing energy to be used when the satellite 110 is in Earth's shadow.

The communications satellite 110 includes a command and control subsystem 212. The command and control subsystem 212 includes electronics for controlling how data is communicated between components of the communications satellite 110. The propulsion subsystem 206, the positioning subsystem 208, and the power subsystem 210 may each be communicatively connected to the command and control subsystem 212 for transmitting data to and receiving data from the command and control subsystem 212.

The communications satellite 110 includes an onboard processor ("OBP") 214. The OBP 214 may be part of the satellite's payload. The OBP 214 communicates with the DRA subsystem 112. The onboard processor 214 may be a digital regenerative subsystem. In other cases, the DRA subsystem may be used with digital transparent subsystems or analog transparent subsystems and "onboard processor" may refer to a digital transparent system of analog transparent system.

The OBP 214 may include a beam output port for outputting a beam signal to a beamforming module (also referred to as "beamforming network") of the DRA subsystem 112. The beam signal may be sent to a beam amplifier module ("BAM"). The OBP 214 may be configured to generate the beam signal and output the beam signal to the beamforming module via the beam output port. The OBP 214 may include a beam input port for receiving a beam signal outputted by a beamforming module of the DRA subsystem 112. The OBP 214 may be configured to receive a beam signal from the beamforming module via the beam input port and process the received beam signal.

The communications satellite 110 also includes a thermal control subsystem (or thermal management subsystem) 216. The thermal control subsystem 216 controls, manages, and regulates the temperature of one or more components of the communications satellite 110 within acceptable temperature ranges, which may include maintaining similar components at a generally uniform temperature. For example, the thermal control subsystem 216 may manage the temperature of components of any one or more of subsystems 206, 208, 210, 212, and 112 by managing heat generated by active heat sources (heat generating components) thereof. The temperature control subsystem 216 may include, for example, any one or more of heater strips, paints and coatings that reflect or absorb heat from Earth and the Sun, heat pipes, and heat sinks. Generally, the thermal control subsystem 216 may protect electronic equipment of the DRA subsystem 112 and other subsystems from extreme temperatures due to intense sunlight or lack of sun exposure on different sides of the satellite's body, as well as self-heating of the DRA subsystem 112 (i.e. heat generating components of the DRA subsystem). The thermal control subsystem 216 may include active components or passive components.

The communications satellite 110 may also include other payload subsystems 226. The other payload subsystems 226 may include any one or more of optical intersatellite terminals, gateway antennas, filters, cables, waveguides, etc.

The communications satellite 110 includes a DRA subsystem 112. The DRA subsystem 112 includes a DRA assembly 222 and a DRA controller ("DRAC") 224. The DRA assembly 222 and the DRAC 224 are communicatively connected for the transfer of signals therebetween. The DRA assembly 222 and DRAC 224 are each communicatively connected to the OBP 214. The DRA subsystem 112 may be a class of beam former having at least 10 beams and at least 500 radiating elements. The product of the number of beams and the number of radiating elements may define the complexity of the beamforming network of the DRA (number of nodes).

The DRA assembly 222 may be a receive (Rx) antenna or a transmit (Tx) antenna. In some cases, the communications satellite 110 may include Rx and Tx DRA subsystems 112. There may be one DRAC 224 per DRA 222 (e.g. a first DRAC for an Rx DRA and a second DRAC for a Tx DRA). Each DRAC 224 is connected to the OBP 214. The communications satellite 110 may include multiple Rx and/or multiple Tx DRA assemblies. In variations, the communications satellite 110 may have a plurality of DRA assemblies 222 or DRA subsystems 112 (which may be Tx or Rx or both). The number of DRA subsystems 112 or DRA assemblies on the communications satellite 110 is not particularly limited. In a particular embodiment, the communications satellite 110 includes two Rx DRA assemblies 222 in two polarizations and two Tx DRA assemblies 222 in two polarizations.

The DRA assembly 222 transmits and/or receives an electromagnetic RF signal within a predetermined signal frequency band. The DRA assembly may be configured to use a subset of the overall signal frequency band.

In a Tx, the DRA assembly 222 receives a signal from the OBP 214, generates a plurality of beams, and provides the beams to RF radiating elements for transmission. In an Rx implementation, the process may operate in reverse, with appropriate modification.

The DRA assembly 222 includes a beamforming module for performing analog beamforming operations. The beamforming operations allow for the array of RF radiating elements to be steered to transmit RF signals in a specific direction and minimize radiated power in other directions (the DRA can null certain directions to prevent interference). Each radiating element in the array may be fed separately with the signal to be transmitted. The phase, and possibly the amplitude, of each signal is then added constructively and destructively in such a way that the energy is concentrated into a narrow beam or lobe and minimized in other directions. Controlling the amplitude may be optional in some designs. The phase of the signal transmitted (or received) by the radiating element is controlled by a beamforming integrated circuit ("BFIC") component of the beamforming module.

The DRAC 224 is communicatively connected to the DRA assembly 222 and the OBP 214 and may send or receive signals to or from either. In some cases, the DRAC 224 may be part of the DRA assembly 222. For example, the DRAC 224 may be implemented on a beamforming module of the DRA assembly 222 (e.g. beamforming module 302 of FIG. 3). Such an implementation may advantageously provide a more compact, lighter, and more efficient DRA.

The DRAC 224 is adapted to configure and control the DRA assembly 222. In particular, the DRAC 224 is adapted to configure and control the beamforming network of the DRA 222 (e.g. beamforming module 302 of FIG. 3). This configuration and control may support any one or more of analog beamforming, beam hopping, and ground cell beam tracking under control of the OBP 214. The DRAC 224 may be configured to send beam hopping instructions to beamforming integrated circuits (e.g. BFICs 310 of FIG. 3) to support beam hopping.

The DRAC 224 manages the operation of the DRA assembly 222 and provides a digital interface with the OBP 214. The digital interface may be the sole digital interface of the DRA subsystem 112 with the OBP 214. The DRAC 224 may interface with the OBP 214 through a dual redundant CAN Bus for command, control and telemetry.

The DRAC 224 receives commands from and provides telemetry to the OBP 214.

As described, the DRAC 224 interfaces with BFICs of the DRA assembly 222. The DRAC 224 may interface with the BFICs through a set of serial busses that may be operated concurrently for parallel partitioning of the beam coefficients distribution. The DRAC 224 may control BFICs through multiple daisy chain connections along a serial bus.

The DRAC 224 stores a collection of Beam Law Tables ("BLTs") which contain beam grids of various sizes, shapes, and center frequencies in a non-volatile memory flash device.

The DRAC 224 may support beam hopping sequences with a programmable number of independent hops The DRAC 224 may support beam hopping with timeslots of programmable duration.

The DRAC 224 may support loading the BLTs to the BFICs under control of the OBP 214 through Beam Law Index (BLI) messages specifying the BLT lists for the hopping sequences.

The DRAC 224 may support ground cell tracking updates at integer number of timeslots as commanded by the OBP 214 or autonomously computed based on the ground cell location.

The DRAC 224 may support muting of the DRA assembly 222 and sleep mode of the DRA assembly 222 for DC power saving. The sleep mode may apply to any one or more of the BFICs, BAMs, and radiating element modules by the virtue of shutting down the electronic power conditioner (e.g. EPC 320).

The DRAC 224 may support applying calibration adjustment coefficients to the BLT per frequency center.

The DRAC 224 may support on-orbit updating of the BLT and the calibration tables.

The DRAC 224 may provide redundant CAN bus (e.g. A and B) and Epoch synchronization interface to the OBP 214 and a set of serial busses to interface with the BFICs of the DRA assembly 222.

The DRAC 224 may include circuitry assembled directly on the BFN PCB. The DRAC 224 may be operate in single string configuration, in dual cold redundancy configuration or in dual hot redundancy configuration, all under OBP 214 control.

Figure 3:
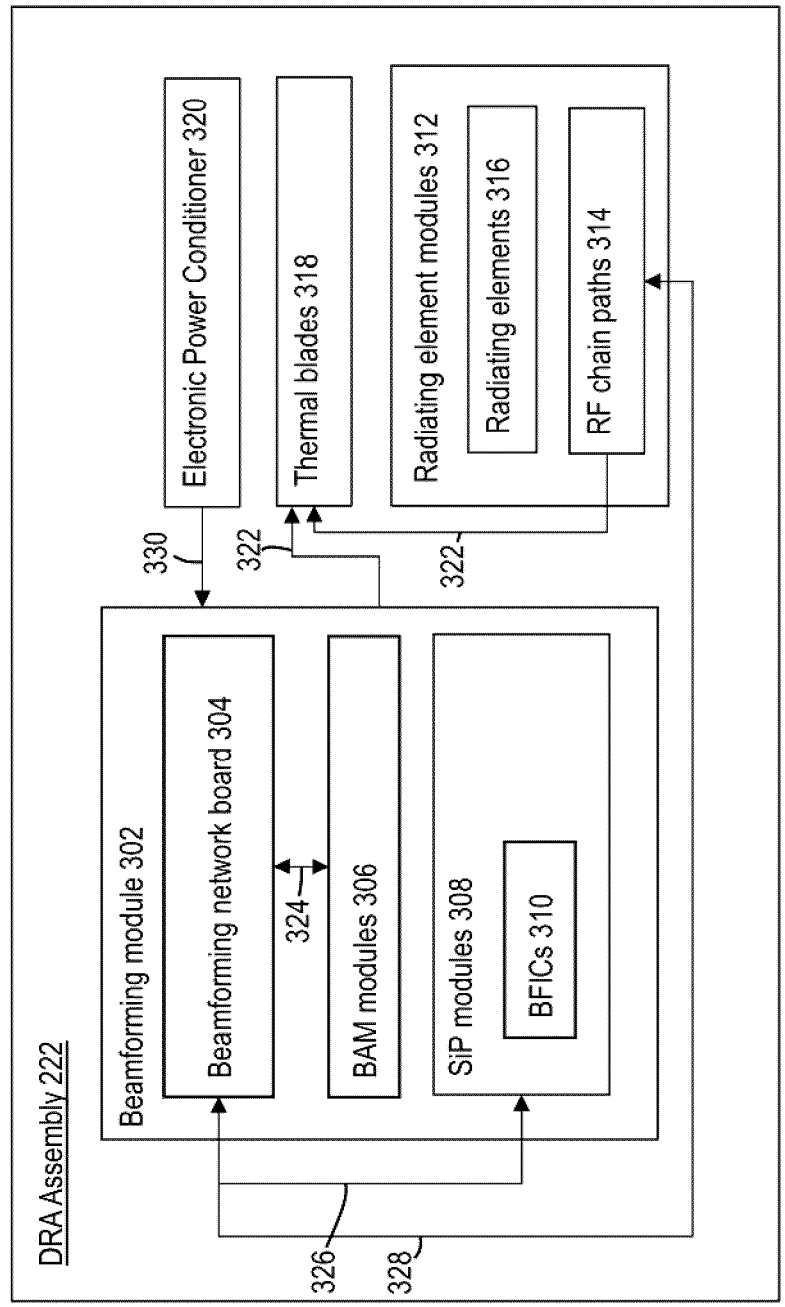
FIG. 3 is a block diagram of a DRA antenna assembly of FIG. 2, according to an embodiment.

Referring now to FIG. 3, shown therein is a DRA assembly 222 of FIG. 2, according to an embodiment. The DRA assembly 222 may be a transmit ("Tx") DRA or a receive ("Rx") DRA.

Generally, the DRA assembly 222 may be a phased array antenna including a collection of antenna or radiating elements 316 assembled together such that the radiation pattern of each individual radiating element 316 constructively combines with neighboring radiating elements 316 to form an effective radiation pattern called a main lobe. The main lobe transmits radiated energy in a desired location while the DRA 222 is designed to destructively interfere with signals in undesired directions, forming nulls and side lobes. The DRA antenna 222 may be designed to maximize the energy radiated in the main lobe while reducing the energy radiated in the side lobes to an acceptable level. The direction of radiation may be manipulated by changing the phase of the signal fed into each antenna element 316. The result is that each antenna element 316 in the array has an independent phase and amplitude setting to form a desired radiation pattern. The DRA assembly 222 uses semi-conductor integrated circuit-based phase adjustments to change the direction of the radiation pattern.

The DRA assembly 222 may be a broadband communication antenna. The DRA assembly 222 may be a class of beamforming antenna having 10 beams or more. The DRA assembly 222 may transmit or receive a plurality of simultaneous beams (e.g. 16).

The DRA assembly 222 may be a direct radiating antenna array covering Ka-band or K-band. The DRA assembly 222 may be a Tx DRA having a frequency range of 17.3-21.2 GHz. The Tx DRA may use a subset of this frequency range. The DRA assembly 222 may be an Rx DRA having a frequency range of 27-31 GHz. The Rx DRA may use a subset of this frequency range. Each DRA assembly 222 may have a single circular polarization (i.e. LHCP or RHCP) or dual polarization (i.e. LHCP and RHCP).

The DRA assembly 222 is configured to transmit or receive a plurality of simultaneous beams which can be independently steered, shaped, and hopped. The number of beams may be 10 or greater. In a particular embodiment, the number of beams is 16. The DRA assembly 222 performs analog beamforming, which may include any beam diameter, any beam shape, and any beam boresight.

The DRA includes a beamforming module 302 for performing analog beamforming. The beamforming module 302 can be used to perform phase and possibly amplitude adjustment at RF frequencies. The beamforming module 302 may also include a DRAC, such as DRAC 224.

The BFN module 302 includes a beamforming network ("BFN") board 304. The BFN board 304 provides structure and organization for components mounted on the surface of the BFN board 304. The BFN board 304 is a printed circuit board ("PCB"). The BFN board 304 may be a multi-layer PCB. The BFN board 304 provides RF, DC, and digital signal routing between components of the DRA assembly 222 which are mounted or otherwise connected to the BFN board 304. Advantageously, the BFN board 304 may be a single board having a flat, planar configuration. Beamforming components, such as SIP modules 308 described below, may be mounted to the BFN board 304 such that the mounted beamforming components define a plane that is substantially parallel to the plane defined by the BFN board 304. Beamforming components may be mounted to opposing sides of the BFN board 304.

The BFN board 304 has various active components connected thereto via interconnects. Active components may include BAMs 306, SIP modules 308, and radiating element modules 312, described below. SIP modules 308 are mounted to the BFN board 304.

The BFN board 304 may provide different DC levels required for each active component. The BFN board 304 may route digital signals from the DRAC to the SIP modules 308.

Active components may be connected to the BFN board 304 by spring-loaded electrical connector. The SIP modules 308 may use a spring-loaded connector interposer to connect to the BFN board 304.

The layout of the BFN board 304 may be optimized for SIP module 308 placement and thermal management of active heat generating components. The layout of SIP modules 308 on the BFN board 304 may be optimized to ease routing and minimize performance degradation. The layout of SIP modules 308 on the BFN board 304 may be optimized for mechanical attachment of SIP modules 308 back-to-back (double stack configuration).

The BFN board 304 may be composed of a plurality of layers of high frequency laminate material. The high frequency laminate may be a ceramic-filled PTFE composite. The layered material may have good RF performance. The layers may be attached together using fusion bonding.

The BFN board 304 may be fairly symmetric in the xy plane and may be divided into quadrants.

The BFN board 304 is configured to route beam input RF signals from the OBP (e.g. OBP 214) to the BAM 306. The BFN board 304 is configured to route an output of the BAM 306 (beam input signals) to SIP modules 308 that control the phase and amplitude for the beams and radiating elements. The BFN board 304 is further configured to route an RF output of the SIP modules 308 to a designated radiating element module 312. In an Rx configuration, the BFN board 304 may be configured to perform the foregoing routing in reverse.

The beamforming module 302 includes SIP modules 308. The SIP modules 308 are mounted and electrically connected to the BFN board 304. The electrical connection to the BFN 304 is represented in FIG. 3 by interconnect 326, which facilitates communication between the SIP modules 308 and other components of the DRA assembly 222. The beamforming module 302 may include any suitable number of SIP modules for the application and the number is not particularly limited. SIP modules 308 may be mounted to opposing sides of the BFN board 304 (e.g. top and bottom).

The SIP module 308 may contain M×N beamforming nodes where the DRA 222 has M beams and N*32 radiating elements.

Each SIP module 308 is configured to receive a beam input signal. The SIP module 308 adjusts each beam amplitude and phase for each radiating element 316 to which it is connected. For example, in a Tx, the SIP module 308 may split each beam to 8 radiating elements and combine 16 beams to each radiating element.

The SIP module 308 has an RF output for each radiating element 316 that it feeds. Each RF output is routed by the BFN board 304 to an RF chain path 314 connected to the radiating element 316 to be fed the RF output.

The SIP module 308 may include an LDO and voltage regulator. The LDO provides BFICs 310 a stable DC supply.

The SIP module 308 may include a plurality of power dividers for splitting or combining RF beam signals.

Each SIP module 308 includes one or more beamforming integrated circuits (BFIC) 310. In an embodiment, each SIP module 308 includes six BFICs 310. The BFICs 310 may be space grade and built with a rad-hard process.

The BFICs 310 implement analog, digital, and RF functions. The BFICs 310 are configured to adjust phase and amplitude for each radiating element 316 and for each beam. The BFICs 310 may have N nodes where N is equal to the number of simultaneous beams multiplied by the number of radiating elements 316 in the DRA assembly 222. The BFICs 310 may be configured to perform beamforming, beam steering, and beam hopping. The BFICs 310 may include RF power splitters and combiners.

The BFICs 310 may be communicatively connected to the DRAC 224 using the BFN board 304 such that the BFICs 310 may receive commands from the DRAC. The DRAC 224 supports beam hopping performed by the BFICs 310.

The beamforming module 302 also includes one or more beam amplifier modules 306 (or BAMs 306). In an embodiment, the beamforming module 302 includes four BAMs 306 per DRA assembly 222.

The BAM 306 is electrically connected to the BFN board 304 via a spring-loaded electrical connector. The electrical connection is represented in FIG. 3 by interconnect 324. The BAM 306 receives RF beam signals from or transmits RF beam signals to the OBP 214 via the electrical connector and the BFN board 304.

The BAM 306 is a multi-port device that combines or splits RF signals between a single port and other ports. The BAM 306 may perform pre-amplification (in a Tx application) or post-amplification (in an Rx application). Pre-amplification may be performed by the BAM 306 to circumvent the splitting and combining losses within the beamforming module 302 and prior to BFIC 310 signal conditioning (losses may occur within the BFN board, within the SIP modules, and/or within the BFICs). This may include the use of a balanced medium power amplifier to provide sufficient gain with needed linearity. Post-amplification may be performed by the BAM 306 to amplify the RF signal coming out from the beamforming module 302 at a low level. In a Tx DRA implementation, the post-BFIC amplification is performed by the RF chain path 314 (described below). In an Rx DRA implementation, the post-amplification is performed by the BAM 306. The BAM 306 may include an LNA chip for performing the amplification. In an embodiment, the BAM 306 may implement three individual RF channels and local DC voltage regulation.

The BAM 306 may be mounted on a thermal blade 318 for heat sinking. Thermal management of the BAM 306 may be achieved by sinking high dissipating components of the BAM 306 (e.g. amplifier unit) to the thermal blade 318.

The DRA assembly 222 includes thermal blades 318. Thermal blades 318 may be the thermal blades 408 of FIG. 4 or the thermal blades 528 of FIG. 5, described below. The thermal blades 318 transfer energy as heat from a heat generating source, such as a component of the beamforming module 302 or the RF chain path 314, to a heat sink. The thermal blades 318 may transfer heat passively (e.g. without the need for pumping). The thermal blades 318 are positioned in the DRA assembly 222 such that they can effectively receive and transfer heat 322 from the heat generating components. This may include mounting certain components of the DRA assembly 222 directly to the thermal blades 318 (e.g. BAM 306, radiating element module 312) or indirectly such that heat can be transferred from the component to the thermal blade 318 (e.g. SIP module 308 may contact and transfer heat to an interface plate on which the thermal blades 318 are mounted). For example, the interface plate may couple heat generated by the SIP module 308 to all of the thermal blades in the DRA.

The DRA assembly 222 includes an electronic power conditioner ("EPC") 320. The EPC 320 may include a plurality of physically separate EPC modules. The EPC 320 cleans and conditions electrical power. The EPC 320 is physically connected to a power source from which the EPC 320 receives the power it conditions. The EPC 320 is connected to the BFN board 304 via one or more physical connectors (e.g. cables) to provide power 330 to components electrically connected to the BFN board 304. The EPC 320 delivers the conditioned power to the beamforming module 302 via the one or more physical connectors. The EPC 320 may interface with a spacecraft power distribution unit for bus power and with a command and data handler for on/off control and for discrete and analog telemetry.

The DRA assembly 222 includes a plurality of radiating element modules 312. Each radiating element module 312 includes a radiating element 316 and an RF signal chain path 314 (or "RF chain" or "RF chain path") connected to the radiating element 316. The RF signal chain path 314 includes an RF path (for an RF signal) and may include DC and various electrical signals. The radiating element module 312 may include a plurality of radiating elements 316 and a plurality of RF signal chain paths 314. In a particular embodiment, each radiating element module 312 includes four radiating elements 316 and four RF chain paths 314, with each radiating element 316 connected to a single RF chain path 314 (this may be referred to herein as a "four-pack"). The number of radiating elements 312 and RF chain paths 314 in the radiating element module 312 is not particularly limited. For example, in other embodiments, the radiating element module may include six radiating elements 316 and six RF chain paths 314 or eight radiating elements 316 and eight RF chain paths.

The radiating element module 312 may include a front end including the radiating element 316, a polarizer, and a filter and a back end including an RF and voltage regulation circuit mounted on a printed circuit board.

Each radiating element 316 is a basic subdivision of the antenna of the DRA assembly 222 which is itself capable of radiating or receiving RF energy.

The RF chain path 318 includes a signal amplification unit for performing signal amplification. The amplification unit may be a solid-state power amplifier (SSPA) or a low noise amplifier (LNA). A major part of the DRA 222 gain resides in the RF chain path 314. The RF chain path 314 may include a polarizer, a filter, an amplifier, and an isolator. The RF chain path 318 may implement a pre-driver before a high-power amplification stage or a gain block or after a low noise amplification stage to provide sufficient amplification. The RF chain path 314 may be implemented with optimal RF taper by using different SSPA types and/or controlling their operation.

The RF chain path 318 includes an electrical connector for connecting the radiating element module 312 to the BFN board 304 and to facilitate communication between the RF chain path and other beamforming components. The electrical connector is represented in FIG. 3 by interconnect 328.

As described, certain active components of the DRA assembly 222, such as radiating element modules 312 (RF chain path 314), BAMs 306, or SIP modules 308, may be electrically connected to the BFN board 304 via a spring-loaded electrical connector. The electrical connector may include springy contacts on two sides of the connector, where a first side contacts a substrate and a second side contacts the BFN board 302. The use of spring-loaded electrical connectors to connect active components to the BFN board 304 described by the present disclosure may be particularly advantageous. Such connectors may require low or zero insertion force. Conventional or existing approaches to establish electrical connections in antenna assemblies, such as soldering, can fail under thermal cycling conditions. For example, a DRA assembly mounted on a communications satellite in orbit may go through erratic thermal cycles. In a LEO application, the communications satellite may travel around Earth every 90 minutes and have variable traffic loading (self-heating may also be quite variable). Such thermal cycling can put significant strain on solder joints, particularly over periods of years where the communications satellite is going around Earth over and over. The DRA assembly 222, and certain active components thereof, may thus be more resistant to the effects of thermal cycling that may be experienced by a communications satellite in orbit by virtue of the use of such spring-loaded electrical connectors, which may improve function and increase reliability of the DRA assembly and communications satellite on which the DRA assembly is mounted.

An example method of operation of the DRA assembly 222 of an Rx type will now be described, according to an embodiment. A radiating composite input signal (e.g. 16 beams) is incident on the radiating elements 316 of the radiating element modules 312 (e.g. 4-pack). The radiating composite input signal is then amplified. This includes amplification by an amplification component (e.g. LNA) in the RF chain path 318 of the radiating element 316. A major part of signal amplification is performed by the RF chain path 314. A signal from each radiating element 316 is then routed to a SIP module 308 mounted on the BFN board 304. The SIP module 308 splits the received signal into a plurality of similar signals (e.g. 16). Each SIP module 308 includes a plurality of BFICs 310 (e.g. 6) which include phase shifters, step attenuators, and coherent combiners (e.g. 512:1). The BFICs 310 phase shifters, step attenuators, and the coherent combiners then extract partially each beam information. Each partial beam at the output of the SIP modules 308 is routed by the BFN board 304 to another coherent combiner which combines the various partial beam information to form complete beam information based on the signal received from each radiating element 316. From the output of the coherent combiners, the BFN board 304 routes each beam to a beam amplifier module ("BAM") 306 input port. The BAM 306 performs amplification on the received beams. The BAM 306 outputs the amplified beams which are routed to an OBP 214 input port for further processing by the OBP 214.

An example method of operation of the DRA assembly 222 of a Tx type will now be described, according to an embodiment. Each beam at the output of the OBP 214 is routed to an BAM input port. The BAM 306 amplifies the received beams. The amplified beams outputted by the BAM 306 are routed from the BAM 306 to a connected BFN input port. Beam signals received at the BFN input port are first split (e.g. into 64). The split beams are routed to a SIP module 308, which further splits the received beam (e.g. in 2). Inside the SIP module 308, signals are routed to the BFICs 310, which performs another split of the signal (e.g. 4-way split). The BFIC 310 also performs phase and amplitude adjustment on the signals. After phase and amplitude adjustment, signals from 16 beams are combined (inside the BFIC 310 and inside the SIP module 308) for each of the radiating elements 316. The signals from the BFN outputs are sent to designated RF chain paths 314. The radiating element module RF chain path 314 amplifies the signal, which is then provided to the radiating element 316 for radiation. A major part of signal amplification is performed by the RF chain path 314.

Figure 4:
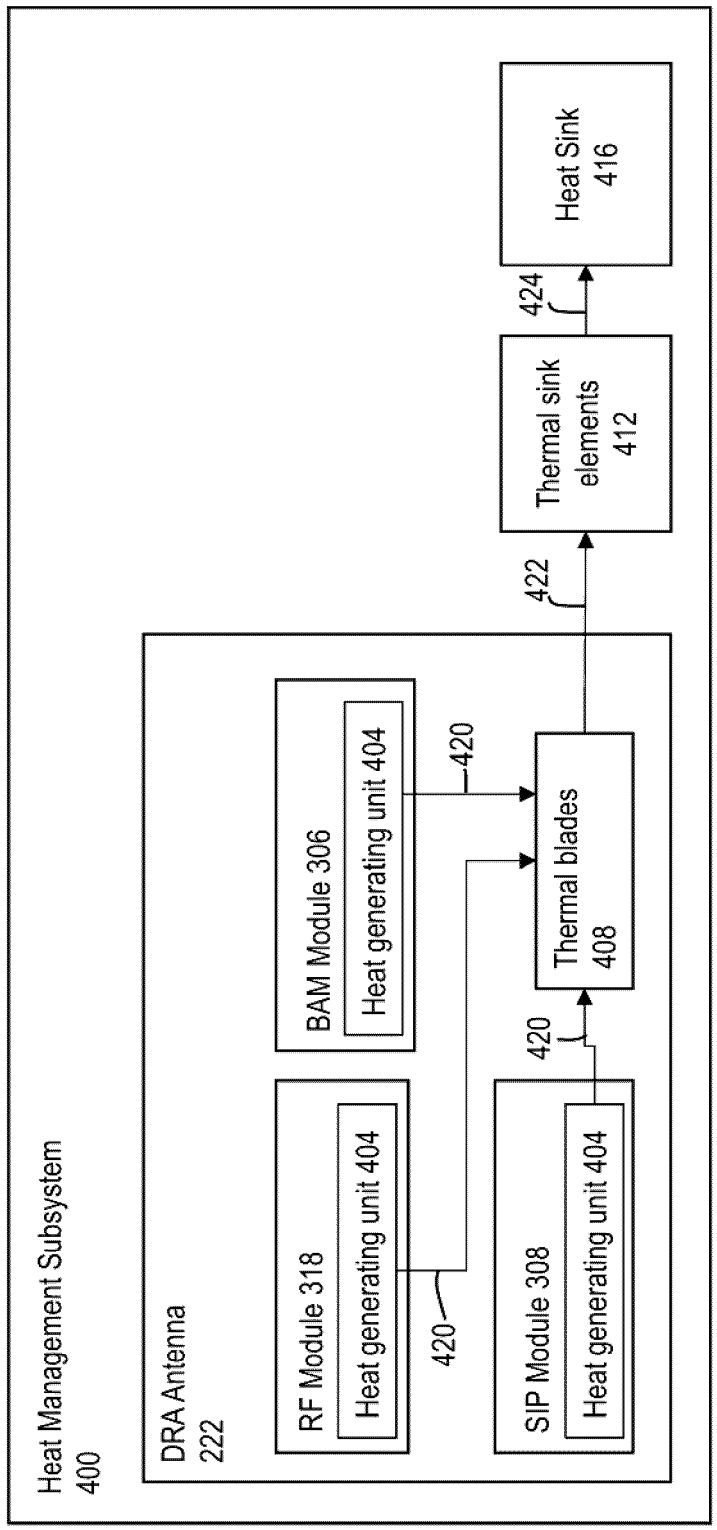
FIG. 4 is a block diagram of a heat management subsystem for use with a DRA antenna assembly, according to an embodiment.

Referring now to FIG. 4, shown therein is a heat management subsystem 400 for managing heat generated by a DRA assembly (e.g. DRA assembly 222 of FIG. 2), according to an embodiment. The heat management subsystem 400 may include components of the thermal control subsystem 216 or may be a component thereof.

The heat management subsystem 400 is configured to manage heat generated by active components of the DRA assembly 222 and improve thermal efficiency of the DRA assembly 222. The heat management subsystem 400 may passively manage heat generated by the DRA assembly 222 (i.e. provide passive cooling). The heat management subsystem 400 may passively maintain active components in the DRA assembly 222 such as amplifier units at a uniform temperature and/or at a uniform temperature relative to other amplifier units. The heat management subsystem 400 may provide high levels of natural convection and heat dissipation by utilizing a heat spreader (e.g. thermal blades) or a heat sink to maximize the radiation and convection heat transfer modes to provide passive cooling.

The heat management subsystem 400 may operate for a plurality of DRA assemblies.

The DRA assembly 222 includes a plurality of heat generating units 404. Heat generating units are active components of the DRA assembly 222 which, by virtue of their operation, generate heat (i.e. they are an active heat source). The heat generating unit 404 may be an electronic device, such as an amplifier.

Components of the DRA assembly 222 which include a heat generating component 404 include RF module 318, SIP module 308, and BAM 306. The heat generating component 404 of the RF module 318 may be found in the RF signal chain path 314.

The heat management subsystem 400 includes thermal blades 408. The thermal blade 408 may have one or more heat generating units 404 mounted thereon. The thermal blades 408 may act as a heat spreader for heat generated by the heat generating unit 404. The thermal blades 408 may take heat out of the center of the DRA assembly 222 and to the sides. The thermal blades 408 may be configured to passively transfer or dissipate heat generated by the heat generating unit 404 to one or more thermal sink elements (e.g. thermal sink elements 412 described below). The thermal blades 408 may passively maintain heat generating units 404 of a similar type at a generally uniform temperature relative to one another.

In some cases, the thermal blades 408 may receive heat indirectly from the heat generating unit 404. For example, heat generated by a heat generating unit of a SIP module 308 may be transferred to an interface plate of the DRA assembly and then to the thermal blades 408 (which may themselves be mounted on the interface plate).

Each thermal blade 408 includes a heat pipe. The heat pipe may be adapted to actively or passively transfer heat. The heat pipe may be an active heat pipe, such as a fluid pump adapted for active cooling (actively cooling the thermal blades). The heat pipe may be a passive heat pipe for performing passive cooling. The heat pipe may be an oscillating heat pipe (or "pulsating heat pipe"). The oscillating heat pipe may be a conventional oscillating heat pipe. The heat pipe may act as a heat transfer device that combines the principles of thermal conductivity and phase transition to effectively transfer heat between two solid interfaces. In an embodiment, at the hot interface of the heat pipe, a liquid in contact with a thermally conductive solid surface turns into a vapor by absorbing heat from that surface. The vapor then travels along the heat pipe to the cold interface and condenses back into a liquid, releasing the latent heat. The liquid then returns to the hot interface through either capillary action, centrifugal force, or gravity and the cycle repeats.

The heat pipe may include a sealed pipe or tube made of a material that is compatible with a working fluid. In the case of an oscillating heat pipe, the heat pipe may be only partially filled with liquid working fluid. The oscillating heat pipe may be arranged in a serpentine pattern in which freely moving liquid and vapor segments alternate. Oscillation takes place in the working fluid and the pipe remains motionless.

The heat management system 400 further includes thermal sink elements 412 for receiving heat from the thermal blades 408. The transfer of heat from the thermal blades 408 to the thermal sink elements 412 is denoted by heat transfer path 422. The thermal sink elements 412 may include heat pipes. The spacecraft heat pipes may function similarly to the thermal blades with respect to heat transfer/exchange. Heat exchange between the thermal blades 408 and the thermal sink elements (e.g. spacecraft heat pipes) occurs through conduction. Heat is transferred from the thermal blades 408 to the thermal sink elements 412 at a thermal exchange interface. The thermal exchange interface may be on a top surface of the thermal blades 408. The thermal blades 408 transfer heat from the heat generating unit 404 to thermal sink elements 412 along heat dissipation path 422. The thermal sink elements 412 may be heat pipes (e.g. spacecraft heat pipes).

The thermal sink elements 412 may be directly mounted to the thermal blades 408. For example, the thermal sink elements 412 may be directly mounted to a top surface of the thermal blades 408, where the top surface provides the thermal exchange interface between the thermal blades 408 and the thermal sink elements 412.

The thermal sink elements 412 may transfer the heat received from the thermal blades 408 to a heat sink 416, such as a radiator. The transfer of heat from the thermal sink elements 412 to the heat sink 416 is denoted by heat dissipation path 424. The heat sink 416 may be a spacecraft dedicated radiator. The heat sink 416 may be configured to reject received heat to the environment (e.g. space). The heat sink 416 may be a spacecraft panel or a flat plate radiator mounted to the spacecraft. The spacecraft panel may be a structural spacecraft panel or may be a panel deployed once the spacecraft is in orbit. The heat sink 416 may reject heat by infrared radiation from a surface of the heat sink 416.

Figure 5A:
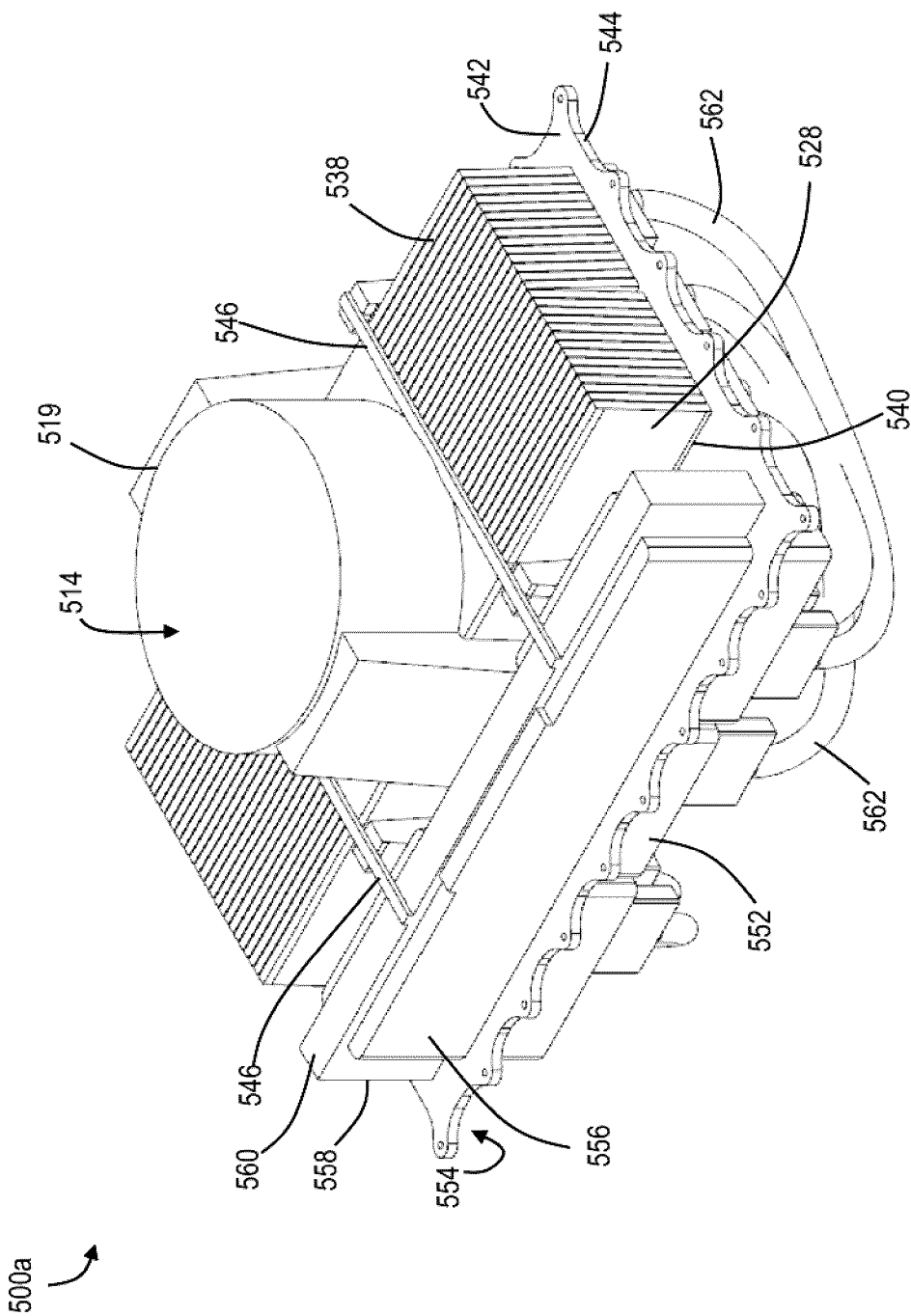
FIG. 5A is a perspective view of a DRA assembly, according to an embodiment.
Figure 5B:
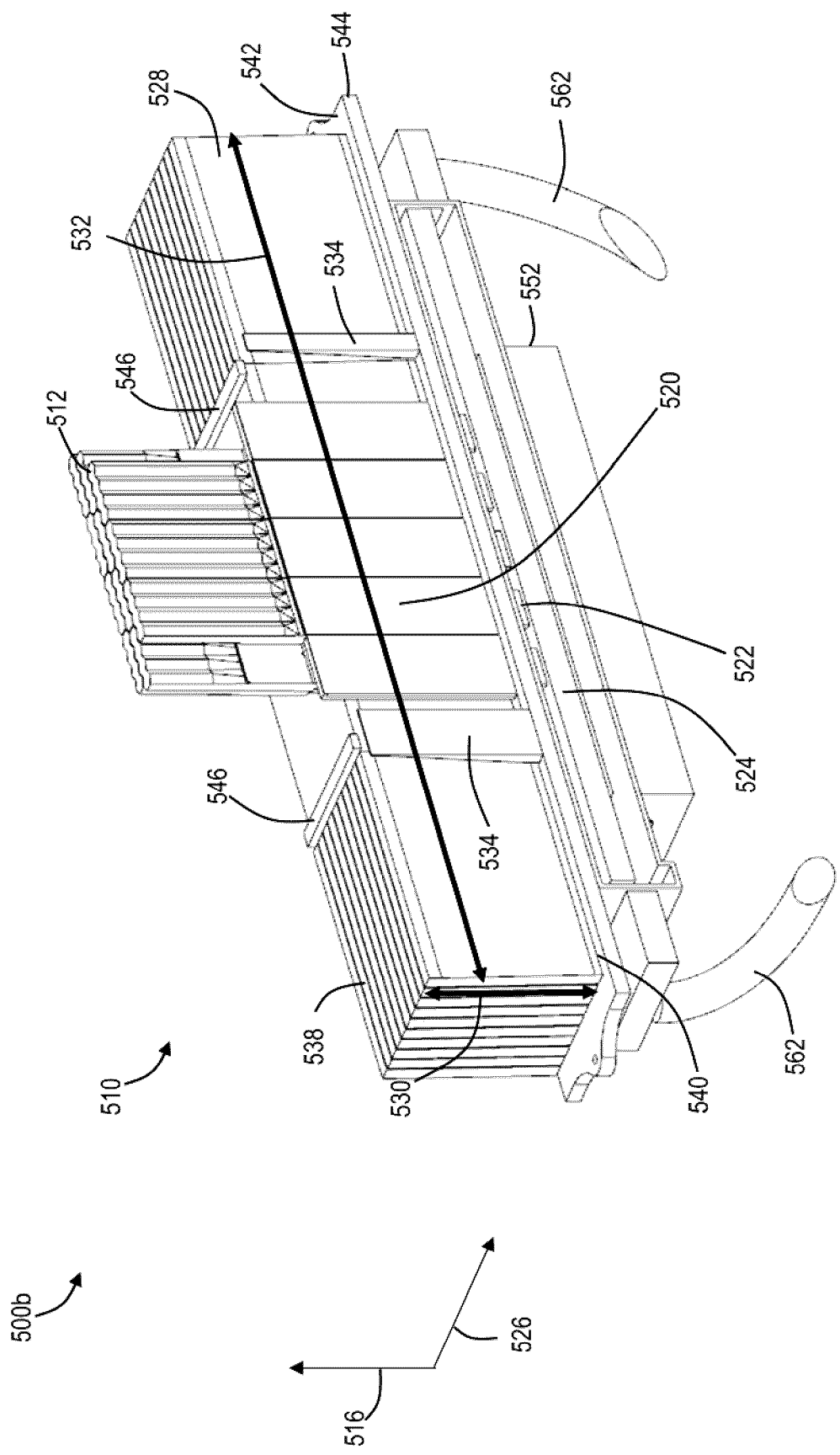
FIG. 5B is a cross section view of part of the DRA assembly of FIG. 5A, according to an embodiment.

Referring now to FIGS. 5A and 5B, shown therein are a perspective view 500a and a partial cross-section view 500b of a DRA assembly 510, according to an embodiment.

The DRA assembly 510 may be the DRA assembly 222 of FIGS. 2 and 3. The DRA assembly 510 may be a component of the or the DRA subsystem 110 of FIG. 1.

The DRA assembly 510 may be mounted on a spacecraft, such as a communications satellite (e.g. satellite 110 of FIG. 1).

The DRA assembly 510 can be used to transmit and/or receive an electromagnetic RF signal of a predetermined signal frequency band.

Figure 8A:
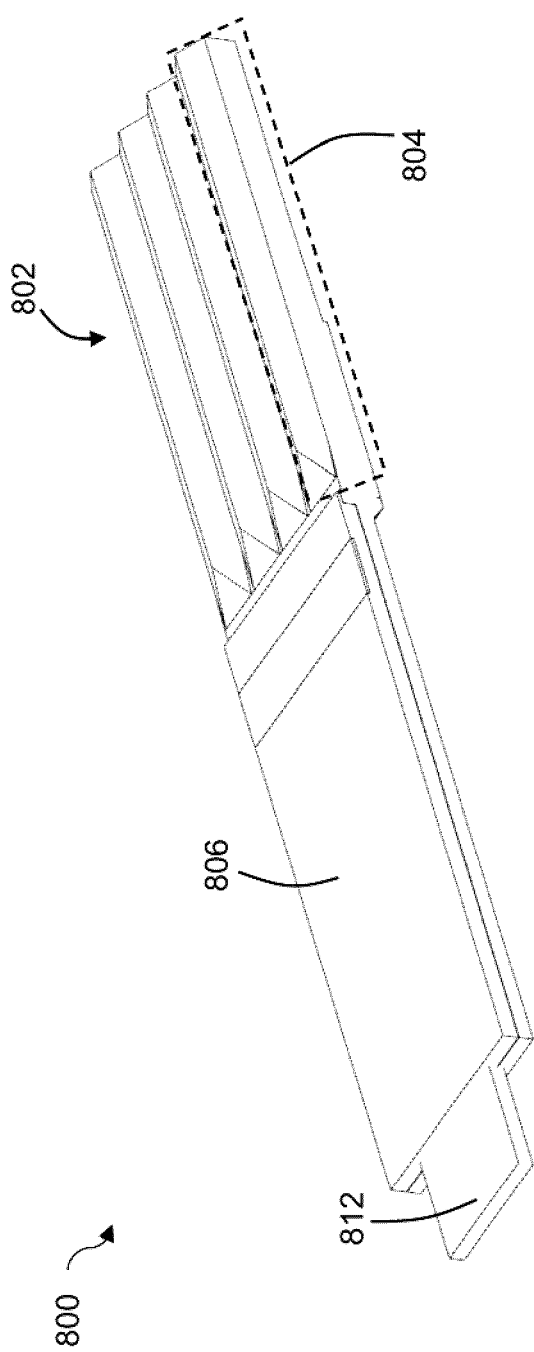
FIG. 8A is a perspective view of a radiating element module having a four-pack configuration, according to an embodiment.
Figure 8B:
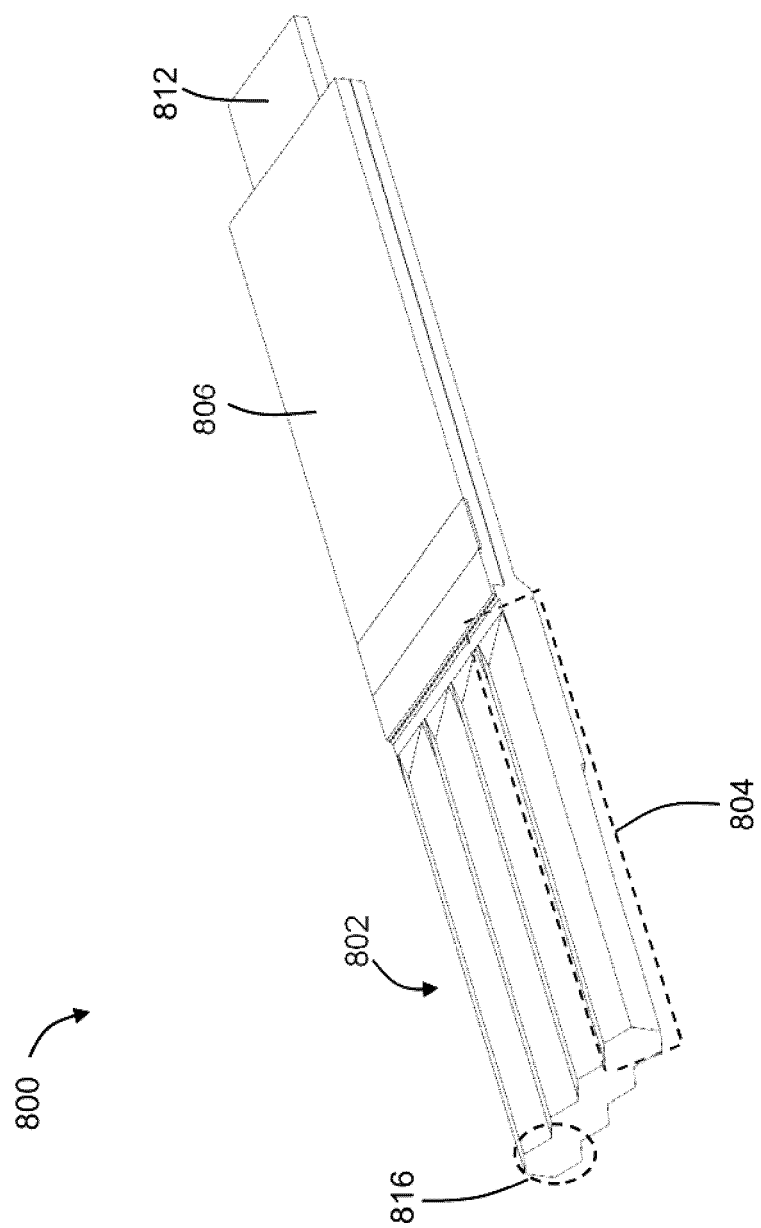
FIG. 8B is a second perspective view of the radiating element module of FIG. 8A.

The DRA assembly 510 includes a plurality of radiating elements 512. The radiating elements 512 are obscured in FIG. 5A by a sunshield 519 which covers the radiating elements 512. The radiating elements 512 form a radiating element active lattice which defines a radiating surface 514 of the DRA assembly 510. The radiating surface 514 may be approximately circular in shape. The radiating elements 512 define a radiating element plane 516, which in denoted in FIG. 5B by arrow 516. The radiating elements 512 are configured in four-packs (i.e. groups of four radiating elements 512 belonging to the same radiating element module and which are physically connected together). An example of a radiating element four-pack is shown in FIGS. 8A and 8B. Radiating elements 512 in a respective four-pack are arranged in a row. As previously noted, the number of radiating elements (and RF chain paths) in a radiating element module are not particularly limited and the four-pack configuration is merely one example of a radiating element module. For example, other variations may include a six-pack radiating module or an eight-pack radiating element module.

Each four-pack of radiating elements 512 is attached to an RF module 520. The RF module 520 houses four RF signal chain paths for signal amplification. Each of the four RF chain paths in the RF module 520 is connected to a single radiating element 512 in the four-pack. The RF module 520 (and thus the RF chain paths therein) is configured in the same plane 516 as the radiating elements 512.

Each RF module 520 includes an interconnect 522. The interconnect 522 may comprise a plurality of connectors (i.e. one or more RF connectors, one or more DC connectors, other electrical connections). The interconnect 522 is a spring-loaded electrical connector. The connector 522 may connect the RF path of the RF signal chain path to the BFN board, as well as other components of the RF signal chain path such as DC and various other electrical signals. The interconnect 522 is located at an end of the RF module 520 opposing the end of the RF module 520 to which the radiating elements 512 are attached. Together, a four-pack of radiating elements 512, an RF module 520, and an interconnect 522 compose a radiating element module. Radiating element modules (including radiating elements 512, RF modules 520, and interconnects 522) are shown in FIG. 5B. It is to be understood that FIG. 5B shows only a subset of the radiating element modules of the DRA assembly 510 (for ease of viewing) and that additional radiating element modules are mounted to the thermal blades 528 in DRA assembly 510. Generally, each thermal blade 528 includes at least one radiating element module mounted thereto. A given thermal blade 528 may have one or more radiating element modules mounted to one side of the thermal blade or may have one or more radiating element modules mounted to two (opposing) sides. For example, a thermal blade 528 that is an outermost or end thermal blade in the DRA may have radiating elements mounted only to one side.

The interconnect 522 connects the RF module 520 (and thus the RF chain paths contained therein) to a BFN board 524.

The BFN board 524 is configured in and defines a board plane 526. The board plane 526 is denoted by arrow 526 in FIG. 5B. The board plane 526 is generally perpendicular to the radiating element plane 516. That is, the BFN board 524 and the radiating element modules (including radiating elements 512 and RF modules 520) are configured generally perpendicular to each other in the DRA assembly 510.

The DRA assembly 510 includes a plurality of thermal blades 528. Each RF module 520 is attached to a thermal blade 528. The thermal blades 528 are generally arranged between rows of RF modules 520. Each thermal blade 528 has one or more RF modules 520 attached to opposing sides of the thermal blade 528. The thermal blades 528 may be connected to spacecraft bus heat pipes or spacecraft bus thermal interfaces.

The thermal blades 528 are mounted generally perpendicular to the BFN board 524 (and interface plate 544, described below). The thermal blades 528 define a blade plane that is generally parallel to the radiating element plane 516 and generally perpendicular to the board plane 526.

Each thermal blade 528 may comprise one or more heat pipes (e.g. oscillating heat pipes) and solid metallic (e.g. aluminum) thermal blades for facilitating heat transfer from active components of the DRA assembly 510 and maintaining temperature uniformity. The thermal blades 528 may have high efficiency heat transport capability. The thermal blades 528 may have a passive design containing no moving parts. The thermal blades 528 may be actively cooled using a fluid pump. The thermal blades 528 may be configured to take heat out of the center of the DRA assembly 510 (e.g. where RF modules 520 are mounted) and to the sides. Such heat transfer is further illustrated and described in FIG. 10.

The thermal blades 528 may provide mechanical alignment for the DRA assembly 510 (e.g. by mounting components thereon). The thermal blades 528 may also provide structural support for the components mounted thereon, such as the radiating element modules.

Each thermal blade 528 has a blade height 530 and a blade length 532. Blade height 530 may vary in different embodiments of the DRA assembly. Blade height 530 may be selected based of the layout of the radiating element modules and thermal spreading requirements. Blade length 532 may also vary. Blade length 532 may be selected based on a number of spacecraft heat pipes that are to be mounted on the thermal blades 528 (e.g. more spacecraft heat pipes may require a longer blade length for mounting the spacecraft heat pipes and providing thermal interfaces thereto). Blade length 532 may be shorter for an Rx DRA assembly as compared to a Tx DRA assembly. Blade length 532 may be selected based on the heat generated by the components mounted thereon.

The DRA assembly 510 also includes a plurality of BAMs 534. In an embodiment, the number of BAMs in the DRA assembly 510 is four.

Each BAM 534 includes an interconnect. The interconnect is a spring-loaded electrical connector. The interconnect connects the BAM 534 to the BFN board 524. The BAMs 534 are configured in generally the same plane 516 as the radiating element modules. Thus, the BAMs 534 are configured generally perpendicular to the BFN board 524.

Each BAM 534 is mounted to a thermal blade 528. The BAM 534 may be mounted to the thermal blade 528 similarly to the RF module 520. By mounting the BAMs 534 to the thermal blades 528, heat generated by an active component of an BAM 534 can be transferred or dissipated to the thermal blade 528.

Each thermal blade 528 includes a top surface 538 and a bottom surface 540.

The top surface 538 may provide a thermal exchange interface for heat received by the thermal blade 528 from active components of the DRA assembly 510 (and thus provides a DRA external thermal interface for the DRA assembly 510). For example, spacecraft heat pipes may be mounted onto the top surface 538 of the thermal blades 528 to receive heat from the thermal blades 528 via the thermal exchange interface. The number of spacecraft heat pipes mounted to the thermal blades 528, the thermal interface material, and the number of mounting interfaces may vary. The top surface 538 may be sized to be large enough to transfer heat with a low temperature delta penalty. The top surface 538 may include a high efficiency thermal filler.

The bottom surface 540 may be used to mount the thermal blade 528 (and, as a result, those components mounted to the thermal blades, such as radiating element modules and BAMs 536) to a top surface 542 of a spacecraft interface plate 544. The spacecraft interface plate 544 is mounted to a spacecraft bus panel. Heat may transfer from the interface plate 544 (heat from the SIP) to the thermal blade 528 via interface 540. Heat may transfer from the SIP module to the interface plate 544. The interface plate may couple heat coming from SIP modules to all the thermal blades 528 in the DRA 510.

The DRA assembly 510 includes cross straps 546. The cross straps 546 may provide additional structural alignment and configuration of the DRA assembly 510, such as by securing the thermal blades 528 together. The cross straps 546 are attached to the thermal blades 528 at top surface 538. Cross straps 546 are included on each side of the radiating element active lattice.

The DRA assembly 510 may include one or more radiation shields. The radiation shields may be used to cover exposed RF modules 520 (e.g. on the front of the foremost thermal blade and on the back of the rear-most thermal blade). The radiation shields are mounted to the thermal blades 528.

Figure 6:
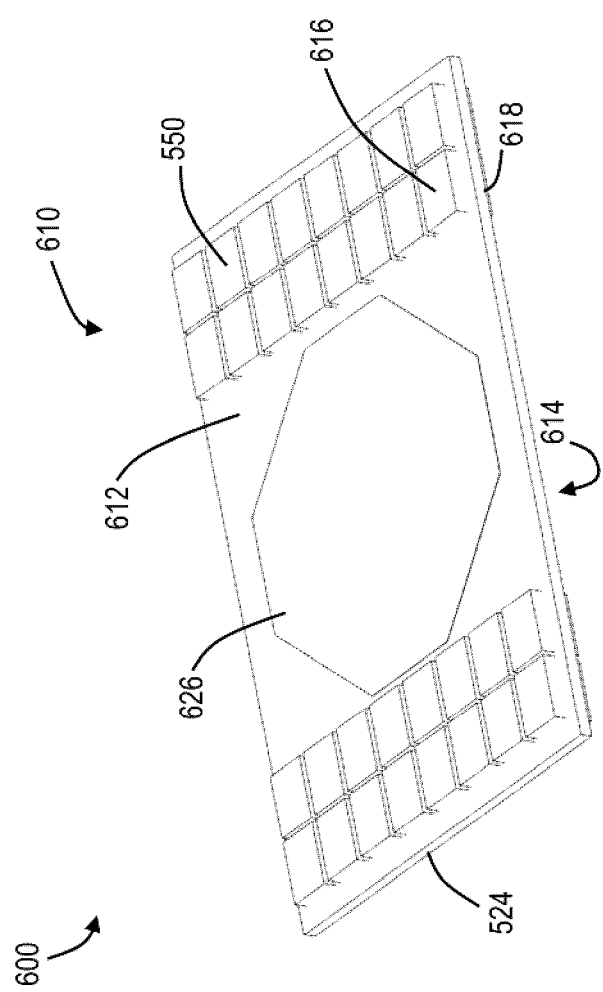
FIG. 6 is a top perspective view of a beamforming network ("BFN") assembly, according to an embodiment.

The DRA assembly 510 includes a plurality of SIP modules (not shown). The SIP modules are mounted to opposing sides of the BFN board 524 (such as shown in FIG. 6, described below). The SIP modules may be configured in a double-stack configuration on the BFN board 524. The SIP modules may be mounted to the BFN board 524 such that the plane (or planes, in that case of top and bottom mounted SIP modules) defined by the SIP modules is substantially parallel to the plane defined by the BFN board 526 (i.e. plane 526). SIP modules mounted to the top surface of the BFN board 524 may be thermally coupled to the interface plate 544 to conduct heat from heat generating units of the SIP modules to the thermal blades 528 for dissipation.

The DRA assembly 510 includes a BFN cover 552. The BFN cover 552 is attached to a bottom surface 554 of the interface plate 544. The BFN cover 552 houses the BFN board 524 and components mounted thereto, such as the SIP modules.

The DRA assembly 510 may include one or more EPC modules 556. The EPC modules 556 are mounted to a dedicated EPC thermal blade 558. The EPC thermal blade 558 may be structurally and functionally similar to the thermal blades 528. The EPC thermal blade 558 includes a top surface 560 which provides a thermal exchange interface for the EPC thermal blade 558. Cross straps 546 are also mounted to the top surface 560 of the EPC thermal blade 558.

Mounting the EPC modules 556 on a dedicated thermal blade 558 may advantageously allow for shorter cable lengths. The EPC modules 556 may be mounted on the EPC thermal blade 558 such that there is a large thermal exchange area between EPC module boards and the thermal blade 558.

The EPC thermal blade 558 is attached to the interface plate 544 (similarly to thermal blades 528). The EPC modules 556 extend through holes in the interface plate 544 such that connector ports of the EPC modules 556 are exposed on the underside of the interface plate 544.

Connectors 562 are connected to the connector ports of the EPC modules 556 at a first end and to connector ports on the BFN board 524 at a second end. The connectors 562 run through holes in the BFN cover 552 to connect to the BFN board 524.

The DRA assembly 510 may provide various advantages. The DRA assembly 510 has a modular scalable design which may be high performance and easy to integrate. The DRA assembly 510 uses a single board for the beamforming network. The single beamforming network board may carry all RF and electrical signals and DC power to the RF signal chains of the DRA 510. Having a single board for the beamforming network may provide various advantages, such as lower cost, lower mass, lower quantity or interconnects, fewer parts to assemble, etc. The DRA assembly 510 may be configured such that all SIP modules 550 and the BFN board 524 are generally in the same plane (e.g. plane 526). This configuration may advantageously simplify the interconnections between the BFN board and the radiating element modules.

Referring now to FIG. 6, shown therein is a top perspective view 600 of a BFN assembly 610 of the DRA assembly 510 of FIG. 5, according to an embodiment.

The BFN assembly 610 is a single board planar implementation.

The BFN assembly 610 includes BFN board 524. The BFN board 524 includes a top surface 612 and a bottom surface 614.

The BFN assembly 610 includes a plurality of SIP modules 550. The SIP modules 550 may be mounted in one plane. By having the SIP modules mounted in one plane (i.e. in planar configuration with the BFN board), various issues associated with having the SIP modules mounted on multiple boards, and thus on multiple planes, can be avoided. For example, if the SIP modules are mounted on multiple boards, and thus on multiple planes, the interconnection between them is complex and leads to higher mass, higher cost, and degraded RF performance.

The SIP modules 550 include top mounted SIP modules 616, which are mounted to the top surface 612 of the BFN board 524, and bottom mounted SIP modules 618, which are mounted to the bottom surface 614 of the BFN board 524. The top mounted SIP modules 616 and bottom mounted SIP modules 618 each define a plane that is substantially parallel to a plane defined by the BFN board 524 (e.g. plane 526 of FIG. 5B). The number of SIP modules in the BFN assembly 610 may vary depending on the application.

The SIP modules 550 are mounted to the BFN board 524 in a "double-stack" or "back-to-back" configuration, where each double-stack includes a top mounted SIP module 616 and a bottom mounted SIP module 618. The top mounted SIP module 616 and bottom SIP module 618 are generally oriented on the BFN board 524 in the same way, such that the footprint of the top mounted SIP module 616 aligns with the footprint of the bottom mounted SIP module 618. The top mounted SIP module 616 may be mechanically connected to the bottom SIP module 618 via a plurality of fasteners. The fasteners may act as thermal conductors to conduct heat from the bottom mounted SIP module 618 to the top mounted SIP module 616. The top mounted SIP module 616 may contact an interface plate (e.g. interface plate 544 of FIG. 5) when assembled in the DRA 510, which may facilitate heat transfer from the top mounted SIP module 616 (which may be generated by the top mounted SIP 616, or by the bottom mounted SIP 618 and transferred to the top mounted SIP 616) to the interface plate. The heat may then be transferred or dissipated to thermal blades (e.g. thermal blades 528 of FIG. 5).

The top surface 612 of the BFN board 524 includes a plurality of radiating element module electrical ports which are arranged in area 626. The radiating element module electrical ports are configured to receive an electrical connector of a radiating element module to facilitate electrical connection of the RF chain path of the radiating element module to the BFN assembly 610. The BFN board 524 includes a radiating element module electrical port for each radiating element module in the array. The radiating element module electrical port may include a plurality of ports, such as an RF port for each RF chain in the radiating element module, ¾ DC ports, and multiple digital/CMD/TM ports.

Figure 7:
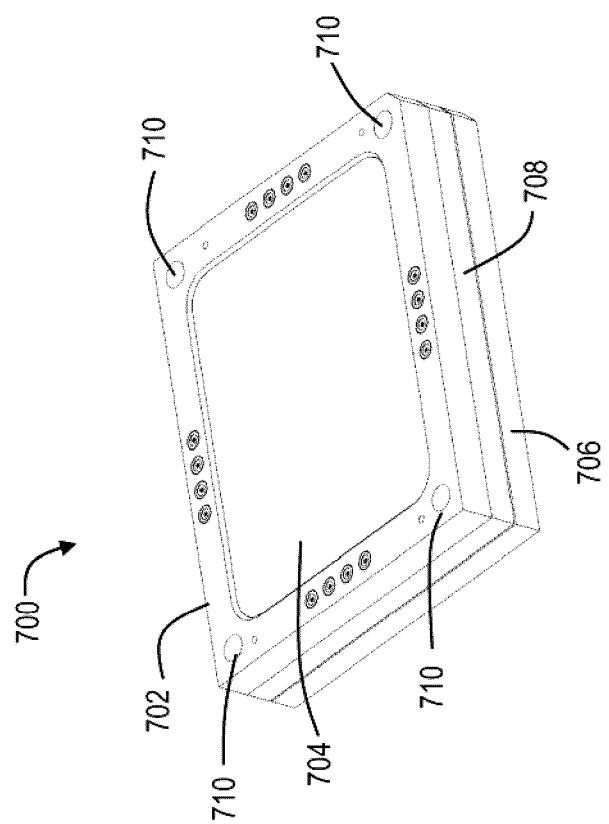
FIG. 7 is a perspective view of a system-in-a-package ("SIP") module, according to an embodiment.

Referring now to FIG. 7, shown therein is a SIP module 700 in isolation, according to an embodiment. The SIP module 700 may be the SIP module 308 of FIG. 3 or SIP module 550 of FIG. 6.

The SIP module 700 may be mounted to a top surface or a bottom surface of a BFN board (e.g. BFN board 524). The SIP module 700 may be arranged in a DRA assembly in a double stacked configuration.

The SIP module 700 includes a top cover 706. The top cover 706 may be composed of aluminum. When assembled in the DRA assembly, the top cover 706 may be in contact with an interface plate, such as interface plate 544 of FIG. 5, and may facilitate thermal transfer from the SIP module 700 (or another SIP module to which it is linked) to the interface plate.

The SIP module 700 includes a substrate layer 708. The substrate layer 708 may be an LTCC substrate. The substrate layer 708 may have one or more BFICs mounted thereon. In a particular embodiment, the substrate layer 708 may have six BFICs mounted thereon.

The SIP module 700 includes a bottom cover 704. When mounted to the BFN board, the SIP module 700 may include a thermal gasket between the SIP module (bottom cover 704) and the BFN board.

The SIP module 700 includes a SIP-to-BFN board interposer 702. The interposer 702 may be an electrical interface routing between one socket or connection to another. The interposer 702 may be a spring-loaded electrical connection to the BFN board. The spring-loaded electrical connection may allow BFN assembly reworkability and DRA assembly reworkability. The interposer 702 may receive signals generated by the BFICs of the SIP module 700 and route the signals to the BFN board for further processing.

The SIP module 700 also includes mounting holes 710. Mounting holes 710 are configured to receive a fastener therethrough. The fastener may be used to connect the SIP module 700 to the BFN board. The fastener may be used to connect the SIP module 700 to a second SIP module in a double stacked configuration.

Referring now to FIGS. 8A and 8B, shown therein is a radiating element ("RE") module 800, according to an embodiment. The radiating element module 800 may be used in the DRA assembly 510 of FIG. 5. While the radiating element module 800 shown includes four radiating elements (and four RF chain paths), in other embodiments the radiating element module 800 may include fewer or more radiating elements and RF chain paths.

The RE module 800 includes an RF radiating element four-pack 802 including four RF radiating elements 804 in a row configuration. The radiating elements 804 may be 3D printed. Each radiating element 804 has a generally hexagonal cross-section 816. In other embodiments, the cross-section of the radiating element 804 may be square or circular. Adjacent radiating elements 804 have an element spacing defined as the straight-line distance between respective geometric centers of the cross sections of the adjacent radiating elements 804 (in this case, the cross section is a hexagonal cross section). The element spacing is also generally maintained between an outer radiating element 804 of the four-pack 802 and an outer radiating element of an adjacent radiating element four-pack in the radiating element array.

The RE module 800 includes an RF module 806. The radiating element four-pack 802 connects to the RF module 806 via a connection. The connection includes an electrical and mechanical interface between the radiating element and the RF chain paths (i.e. between the radiating element component and the RF module). The interface provides RF connectivity and alignment features. The connection promotes alignment of the RF module 806 and the radiating elements 804. Via the connection, the RF module 806 and the radiating element four-pack 802 may be aligned, bonded, and sealed to form the assembled radiating element module 800.

The RF module 806 houses various active components. The RF module 806 includes a signal amplification path for each radiating element 804 for amplifying an RF signal.

The RF module 806 may include mounting holes for receiving a fastener (such as a screw or the like) therethrough to connect the RF module 806, and thus the radiating element module 800, to a thermal blade. The mounting holes may be common mounting holes for mounting back-to-back RE modules 800 on thermal blades throughout the DRA. The mounting holes may be used to compress the RE module 800 onto a thermal interface (e.g. thermal blades) for good conductivity.

The RE module 800 includes a spring-loaded connector 812 for connecting to a BFN board of a DRA assembly. The spring-loaded connector 812 provides RF and DC interfaces. The spring-loaded connector 812 may be able to compensate for translational and rotational tolerances.

The four-pack RE module 800 may ease assembly and the quick customizing or adaptation of the DRA assembly based on antenna requirements (e.g. different numbers of radiating elements).

Figure 9:
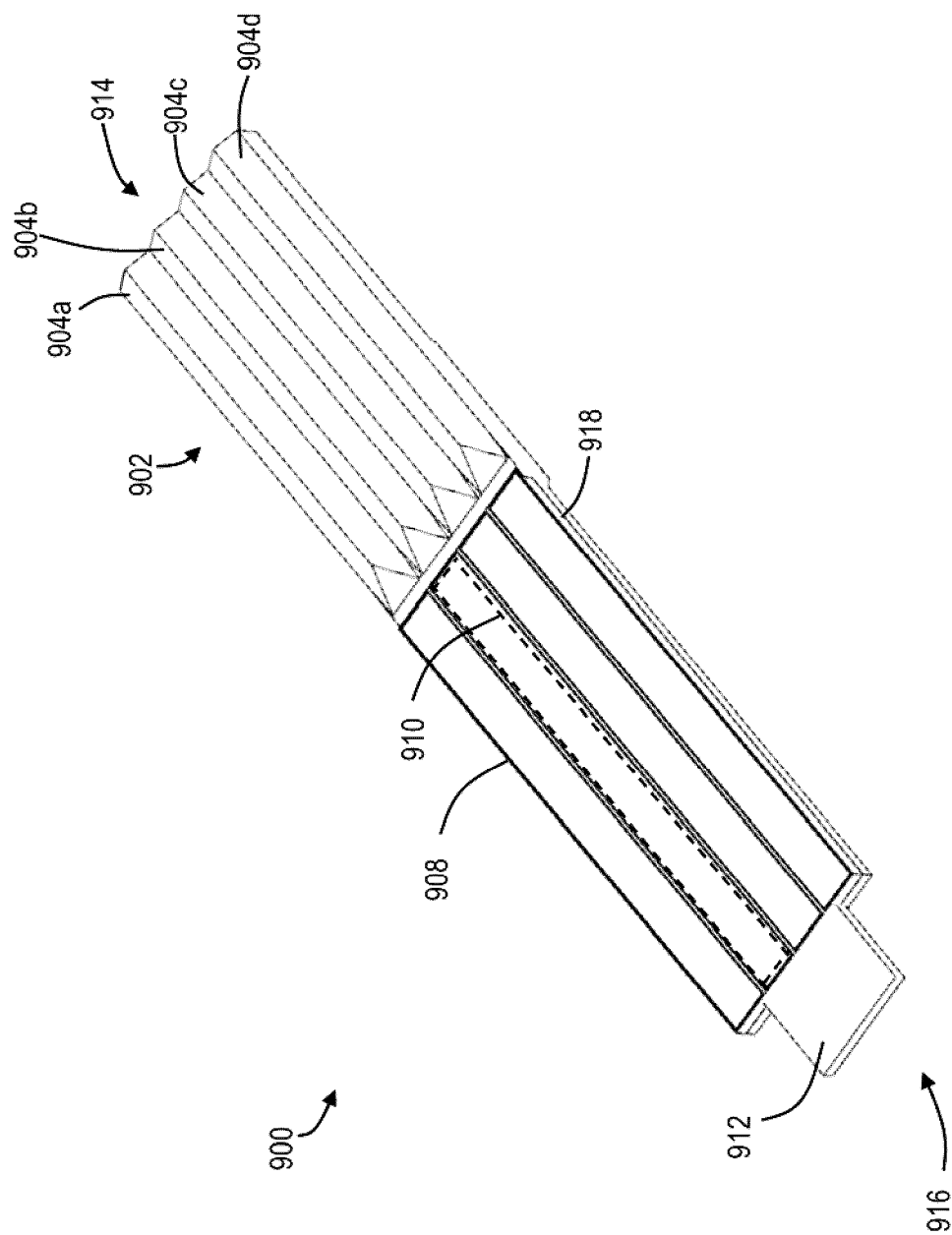
FIG. 9 is a partial cross section view of a radiating element module, showing a cross section view of an RF module, according to an embodiment.

Referring now to FIG. 9, shown therein is a partial cross-section view of a radiating element module 900, according to an embodiment. The portion of the view 900 shown in cross-section view corresponds to an RF module of the radiating element module 900. The radiating element module 900 may advantageously be low cost compatible with high production volumes. The radiating element module 900 may connect to a BFN board (e.g. BFN board 524 of FIG. 5) using no cables.

The radiating element module 900 has a radiating end 914 and a RF chain end 916 which are positioned at opposing ends along a length of the radiating element module 900.

Starting at the radiating end 914, the radiating element module 900 includes a four pack 902 of radiating elements 904*a*, 904*b*, 904*c*, 904*d* (referred to collectively as radiating elements 904, and generically as radiating element 904. The radiating elements 904 are arranged in a row (or straight-line) configuration.

Each radiating element 904 of the four pack 902 may be coupled to a polarizer and/or an RF filter. The filter may be an integral part of the radiating element 904.

The radiating element module 900 includes an RF module 908 which is connected to the radiating elements 904 at a first end proximal to the radiating end and to a spring-loaded electrical connector 912 proximal to the RF chain path end 916. The electrical connector 912 connects the RF module 908 (and thus the radiating element module 900) to a BFN board of a DRA assembly (such as BFN board 524 of DRA assembly 510 of FIG. 5). The RF module 908 (e.g. the housing thereof) may be made an integral part of the radiating element 904 (i.e. the RF module 908 and radiating elements 904 as a single piece).

The RF module 908 includes a circuit board 918 onto which various electrical components are mounted. The circuit board 918 may be a soft organic board. The electrical components include a chipset. The chipset may include a high-power amplifier (HPA) chip or a low noise amplifier (LNA) chip. The chipset may also include RF adjustment chips performing phase and amplitude compensation over temperature. The RF adjustment chips may be used for pre-/post-amplification. The RF adjustment chips may be optimized for low power consumption and dynamic control (amplitude/phase), which may allow the radiating element module 900 to track well in temperature.

The RF module 908 includes an RF signal chain path 910 (or signal amplification path) for each radiating element 904 of the four pack 902 (i.e. the number of RF chain paths equals the number of radiating elements in the radiating element module). The RF chain paths 910 may be arranged adjacent to one another and generally parallel. In an embodiment, the RF module 908 houses four individual RF chains with substantial gain.

Each RF chain is coupled to a dedicated radiating element. For example, in FIG. 9, RF chain 910 is coupled to radiating element 904*b*.

The RF module 908 may include an active RF circuit-radiating element interface, which is the interface between the active RF circuit and the radiating element 904. The RF circuit-radiating element interface may be designed for low loss, wideband RF performance, and ease of industrialization.

The RF chain paths 910 of the RF module 908 may be contained within a collective radiating element footprint (also referred to as collective element footprint, or collectively element volume) of the radiating element module 900 that is defined by the radiating elements 904 (i.e. contained in the volume defined by the collective footprint). Each radiating element 904 defines an individual element footprint (or volume) defined by the cross-section of the radiating element 904 as viewed from the radiating end 914. In this case, the cross-section of the radiating element 904 is hexagonal extending from the radiating end 914 towards the RF chain end 916. The collective or combined element footprint includes the combined individual element footprints of each radiating element 904. The RF chain paths 910 may be arranged generally parallel to one another and within their respective radiating element footprint. Arranging the RF chain paths 910 such that they are all within the collective element footprint of the radiating element module 900 may advantageously be used to achieve reduced (e.g. relatively small) element spacings (i.e. spacing between adjacent radiating elements)

In some cases, an RF chain path 910 may be contained entirely within its individual element volume (such as in the embodiment shown in FIG. 9). Further, in some cases, each RF chain path 910 may be contained entirely within its individual element footprint and all RF chain paths 910 contained within the collective element footprint of the radiating element module 900.

Each 4-pack radiating element module 900 houses individual RF chains with substantial gain.

In a Tx implementation, each RF chain 910 may amplify and transmit a beam formed composite signal originating from an OBP via a plurality (e.g. 16) beam inputs. For Tx, a radiated power taper may be used to optimize the beam performances.

In an Rx implementation, each RF chain 910 may receive and amplify a weak user composite signal prior to performing separation within a beam forming module. For Rx, the gain may be identical for all radiating element modules 900. For Rx, a received power taper may be used to optimize the beam performances.

The RF chain path 910 may include various components such as a filter, an isolator, an RF compartment and a DC compartment. The isolator may provide impedance matching between the amplifier unit (e.g. HPA, LNA) and the radiating element 904. The RF chain path 910 also includes an amplifier, which may be located before or after the filter and the isolator (e.g. before for Tx, after for Rx).

The RF module 908 may be configured such that dissipative devices of the RF module 908, such as the amplifier, dissipate heat along a thermal path to a DRA heat sink (e.g. through the thermal blades to the spacecraft heat pipes). This design may be highly thermally efficient.

Figure 10:
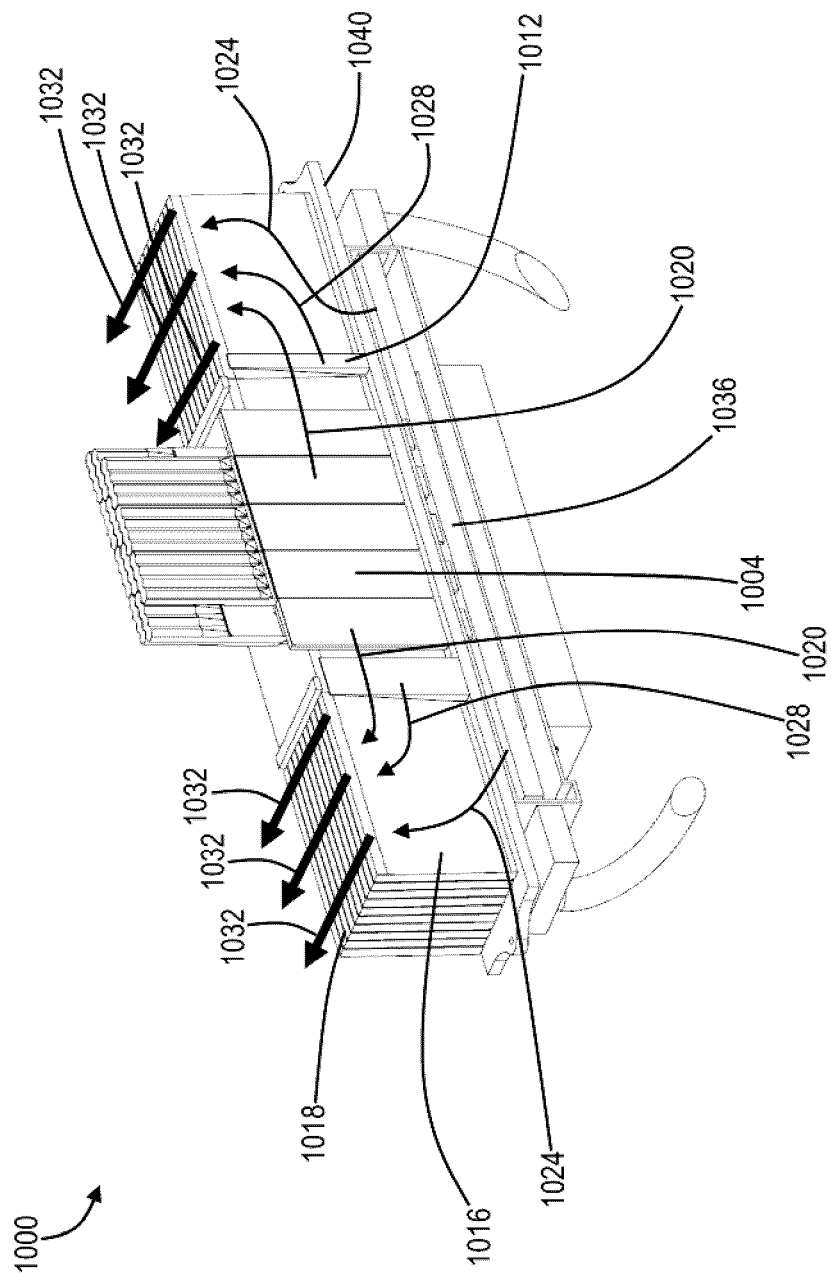
FIG. 10 is a cross section view of a DRA assembly showing heat paths of dissipative components of the DRA assembly, according to an embodiment.

Referring now to FIG. 10, shown therein is a cross section view of a DRA assembly 1000 of the present disclosure illustrating a plurality of heat dissipation paths for heat generating components of the DRA assembly, according to an embodiment. As in FIG. 5B, FIG. 10 shows only a subset of the radiating element modules that are mounted to thermal blades in the assembled DRA. It is to be understood that additional radiating element modules not shown are present in the assembled DRA and that each thermal blade may have at least one radiating element module mounted thereto.

Thermal control and management of the heat dissipation paths of active components of the DRA assembly 1000 may be performed by the heat management subsystem 400 of FIG. 4. The heat management performed by the DRA assembly 1000 is passive.

As previously noted, the DRA assembly 1000 includes dissipative components. That is, the DRA assembly 1000 includes heat generating components that generate and dissipate heat through operation of the DRA assembly 1000. Such components are active components of the DRA assembly 1020 which generate heat that should be managed and controlled in order to maintain efficiency of the DRA assembly 1000 and to keep such components within an acceptable temperature range.

Dissipative components of the DRA assembly 1000 include RF modules, SIP modules, and BAMs. RF modules are represented in FIG. 10 by RF module 1004. BAMs are represented in FIG. 10 by BAM 1012. SIP modules are not shown in FIG. 10 but are mounted to BFN board 1036 (such as in FIG. 6). In some cases, the RF modules 1004, the SIP modules, and the BAMs 1012 may be considered main dissipative components of the DRA assembly 1000 and thus the management by the DRA assembly 1000 of the heat generated by those components may be critical to optimal functioning of the DRA assembly 1000.

Generally, heat from heat generating components of the RF modules 1004, BAMs 1012, and SIP modules is transferred to thermal blades 1016. The thermal blades 1016 are mounted on an interface plate 1040.

The DRA assembly 1000 is configured such that the RF module 1004 (specifically, a heat generating component thereof) transfers heat from the heat generating component to the thermal blade 1016 to which the RF module 1004 is mounted. The heat is transferred along RF module heat dissipation path 1020.

The RF module 1004 includes dissipative components (i.e. heat generating components or heat generating units) such as amplifiers. The amplifier may be a solid-state power amplifier (SSPA) (e.g. in a Tx DRA assembly) or a low noise amplifier ("LNA") (e.g. in an Rx DRA assembly). The RF module may be an SSPA 4-pack module or an LNA 4-pack module.

The DRA assembly 1000 has a low thermal resistance path from the amplifiers to the thermal blades 1016. The RF module 1004 may include a heat spreader located near the high power amplifier (e.g. roughly in the middle of the RF chain path). The RF module 1004 may include a thermal gasket interface between the RF module 1004 and the thermal blade 1016 for transferring heat from the heat generating component of the RF module 1004 to the thermal blade 1016. The thermal gasket may be a high efficiency thermal gasket. High efficiency means that the thermal gasket will efficiently transfer heat from one side of the interface to the other side and thus minimize the temperature difference between the two. The thermal gasket may be adapted (or selected) to minimize the delta temperature between the RF module 1004 and the thermal blade 1016.

Heat generated by the SIP modules is transferred or dissipated along heat dissipation path 1024.

The SIP modules are mounted to a BFN board 1036 which is mounted to an interface plate 1040. The SIP modules may include top mounted and bottom mounted SIP modules. Top mounted SIP modules are mounted to a top surface of the BFN board 1036. Bottom mounted SIP modules are mounted to a bottom surface of the BFN board 1036. Top and bottom mounted SIP modules may be mounted to the BFN board 1036 in a back-to-back configuration.

The SIP module (top or bottom mounted) may include a thermal gasket interface to the BFN board 1036.

Top mounted SIP modules may have a thermal gasket interface to the interface plate 1040.

The SIP module may be designed to include a thermal interface material and aluminum lid.

When double stacking the SIP modules, two thermal paths may be used to transfer heat from the bottom mounted SIP to the top mounted SIP (which is in contact with the interface plate 1040). A first thermal path uses a thermal gasket between each SIP (e.g. lid 704 of FIG. 7) and the BFN board 1036. A second thermal path uses conduction through metallic screws linking both top and bottom mounted SIPs.

Heat generated by the SIP modules is transferred to the thermal blades 1016.

Heat generated by the BAMs 1012 is transferred/dissipated along heat dissipation path 1028.

The BAM 1012 includes a heat generating component. The heat generating component may include one or more amplifiers. The heat generating component (e.g. amplifiers) in the BAM 1012 may have a direct thermal path (e.g. path 1028) to thermal blades 1016.

The thermal blades 1016 each include a top surface 1018 which provides a thermal exchange interface. Heat received by the thermal blades 1016 from RF modules 1004, SIP modules, and BAMs 1012 via heat dissipation paths 1020, 1024, 1028 is dissipated along heat dissipation path 1032 at the top surface 1018 of the thermal blades 1016.

In some cases, heat pipes (e.g. spacecraft heat pipes) may be mounted on the top surface 1018 to receive heat from the top 1018 of the thermal blades and dissipate heat along heat dissipation path 1032 or further transfer to a spacecraft dedicated radiator.

The BFN board 1036 may have additional heat generating components mounted thereon. For example, the BFN board 1036 may have an FPGA mounted thereon (not shown). The FPGA may be a high dissipation component. The FPGA may be purposely mounted on a top side of the BFN board 1036 to have direct thermal path to interface plate 1040 through a thermal filler and pedestal. The heat generated by the FPGA (or other component) may then be transferred through the interface plate 1040 to the thermal blades 1016 (which are mounted on the interface plate 1040), and the heat may then be dissipated by the thermal blades 1016 along heat dissipation path 1032.

Figure 11:
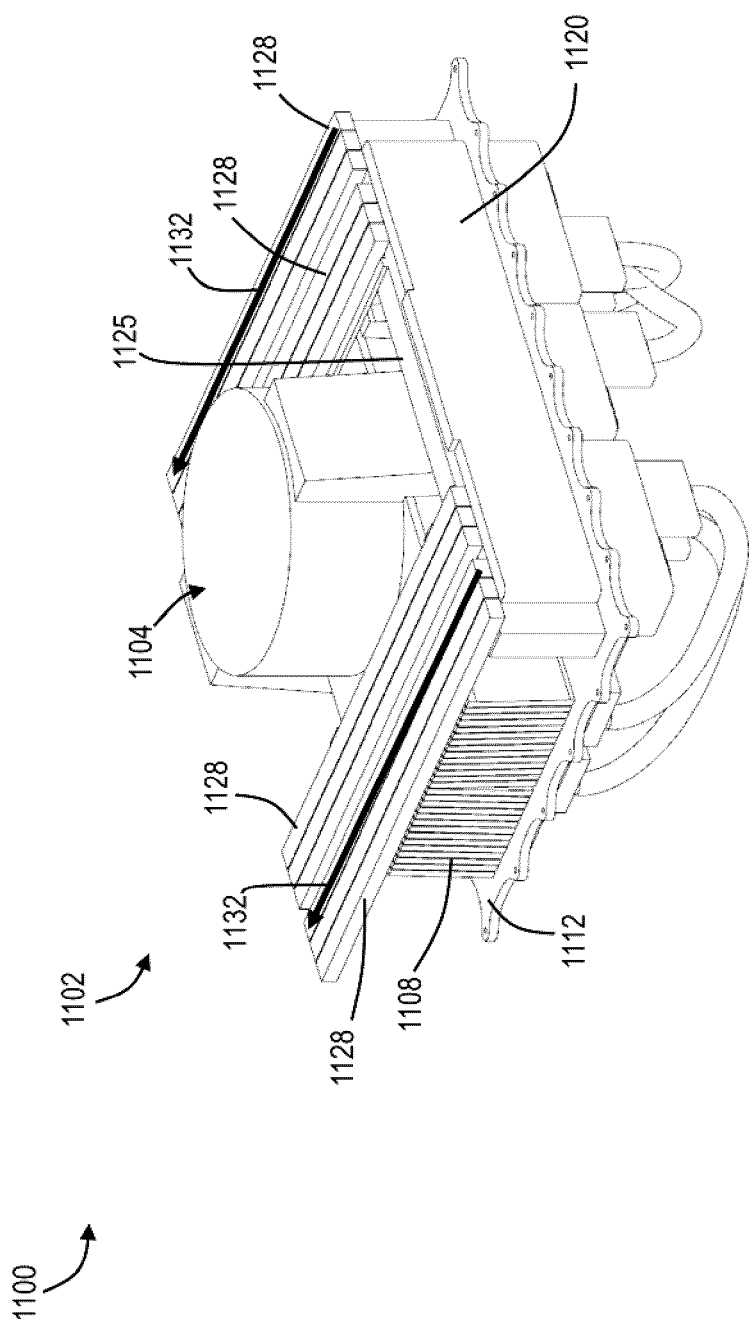
FIG. 11 is a top perspective view of a DRA assembly having a plurality of spacecraft heat pipes mounted thereon, according to an embodiment.

Referring now to FIG. 11, shown therein is a top perspective view 1100 of a DRA assembly 1102 having heat pipes mounted thereon, according to an embodiment. The DRA assembly 1102 may be the DRA assembly 510 of FIG. 5. The DRA assembly 1102 may employ the heat management and transfer of FIG. 10.

The DRA assembly 1102 includes a plurality of radiating elements 1104 which form a radiating element active lattice. The radiating elements 1104 of the radiating element active lattice are each connected to an RF module (not visible) (e.g. RF module 520 of FIG. 5). For example, each RF module may connect to four radiating elements 1104.

The DRA assembly 1102 includes other active heat generating components, such as BAMs and SIP modules, which are not visible in FIG. 11.

The DRA assembly 1102 includes thermal blades 1108 which are each mounted to an interface plate 1112. The interface plate 1112 attaches to a spacecraft panel (not shown) to attach the DRA assembly to the spacecraft.

Each thermal blade 1108 includes a top surface (such as top surface 538 of thermal blade 528 of FIG. 5) which provides a thermal exchange interface for heat passively transferred by the thermal blades 1108 by heat generating components such as the RF module.

The DRA assembly further includes an EPC module 1120 (which is composed of five physically separate modules). The EPC module 1120 is mounted to a dedicated EPC thermal blade 1124 which includes a top surface which acts as a thermal exchange interface for heat passively transferred by the dedicated thermal blade 1124 by a heat generating component of the EPC module 1120.

A plurality of spacecraft heat pipes 1128 are mounted to a top surface of the thermal blades 1108 and a top surface 1125 of the dedicated EPC thermal blade 1124. Note the top surfaces of the thermal blades 1108 are not visible in FIG. 11 as they are obscured by the spacecraft heat pipes 1128. Heat is transferred from the top surfaces 1116, 1125 of the thermal blades 1108 to the spacecraft heat pipes 1128. While FIG. 11 shows there being 12 heat pipes (six on each side of the radiating element active lattice, in groups of three), the number of heat pipes 1128 is not particularly limited. For example, in other embodiments there may be two, three, or five heat pipes 1128 mounted on each side of the radiating element active lattice. The number of heat pipes 1128 may depend on thermal interface requirements and spacecraft configuration.

The heat received by the spacecraft heat pipes 1128 is transferred along heat dissipation path 1132. The spacecraft heat pipes 1128 may transfer the heat along heat dissipation path to a heat sink, such as a thermal radiator.

Figure 12:
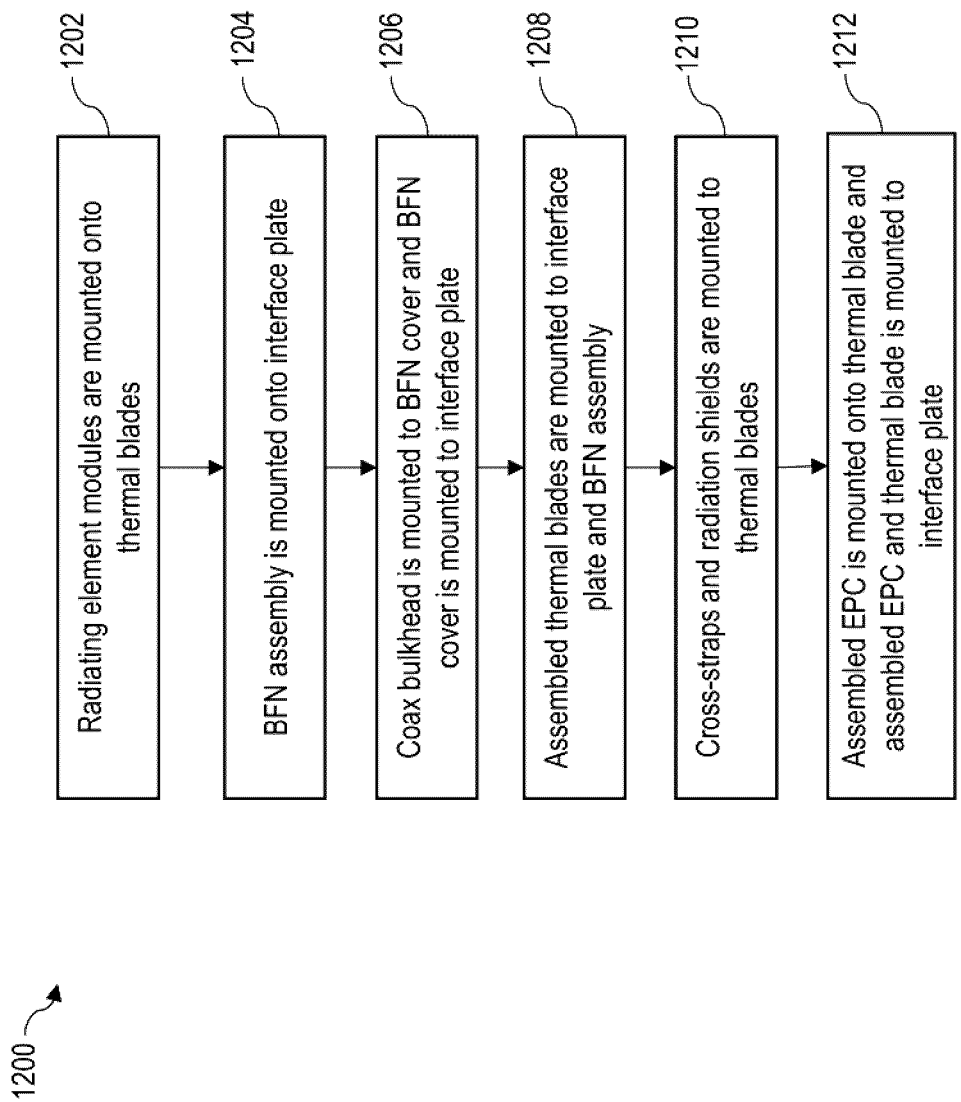
FIG. 12 is a flow diagram of an assembly method for a DRA assembly of the present disclosure, according to an embodiment.

Referring now to FIG. 12, shown therein is an assembly method 1200 for a DRA assembly of the present disclosure, according to an embodiment. The method 1200 may be used to assemble the DRA assembly 500 of FIG. 5, for example.

At 1202, a plurality of radiating element modules, represented by radiating element module, are mounted onto thermal blades. In a particular embodiment, radiating element modules are mounted to opposing sides of the thermal blade (i.e. a row of radiating element modules on each side of the thermal blade). An assembled thermal blade is formed once all radiating elements modules to be mounted onto the thermal blade have been mounted.

At 1204, a BFN assembly is mounted onto an interface plate 2108. The BFN assembly may be the BFN assembly 610 of FIG. 6. The BFN assembly includes a plurality of SIP modules mounted on a BFN board.

At 1206, a coax bulkhead is mounted to BFN cover. A bottom cover is connected to the BFN cover. The BFN cover is mounted to interface plate.

At 1208, assembled thermal blades are mounted to the interface plate via mounting the bottom surface of thermal blade and are connected to the BFN assembly (specifically, the radiating element modules are connected to the BFN board of the BFN assembly via spring loaded electrical connector).

The BFN assembly is disposed beneath the interface plate and in the same plane as the interface plate and housed within the BFN cover.

At 1210, cross-straps and radiation shields are mounted to thermal blades. In particular, cross-straps are mounted to thermal blades on top surface. Radiation shields are mounted on a front surface and a back surface of the front-most assembled thermal blade and rear-most assembled thermal blade, respectively.

At 1212, an EPC module is mounted onto a dedicated EPC thermal blade. The assembled EPC and thermal blade are then mounted onto the interface plate.

Figure 13A:
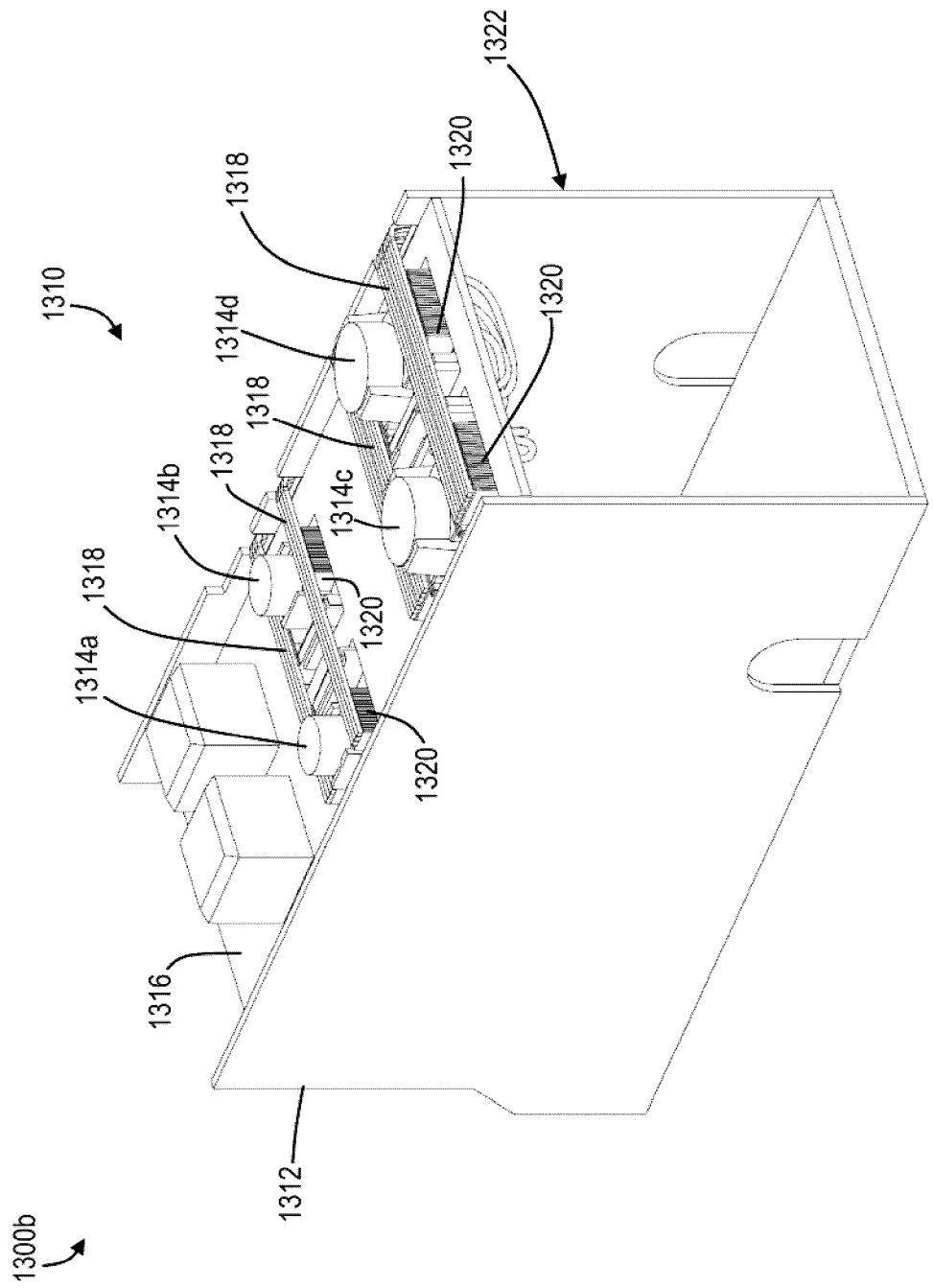
FIG. 13A is a top perspective view of a communications satellite including a spacecraft and a DRA assembly of the present disclosure mounted thereon, according to an embodiment.
Figure 13B:
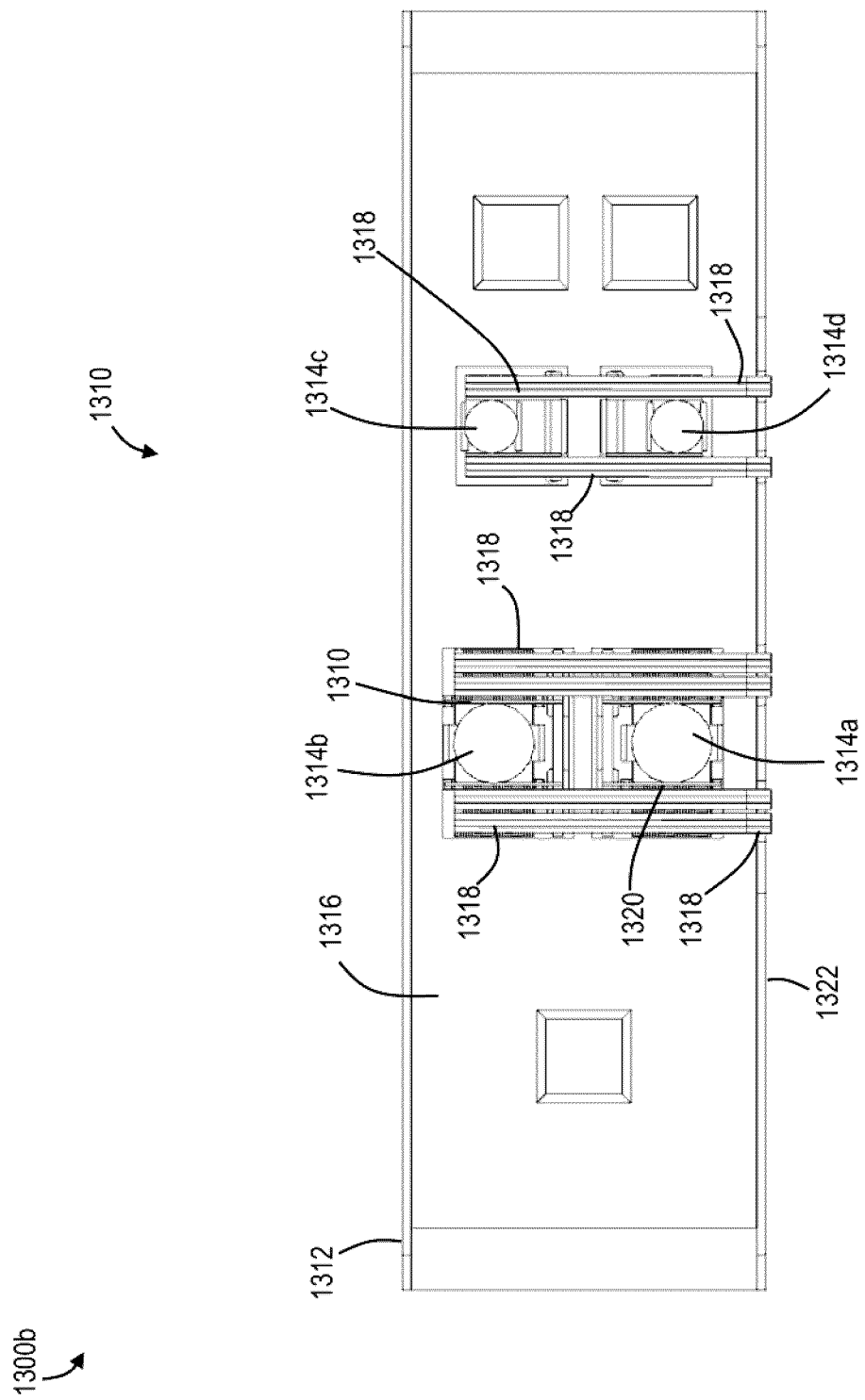
FIG. 13B is a top view of the communications satellite of FIG. 13A.
Figure 14:
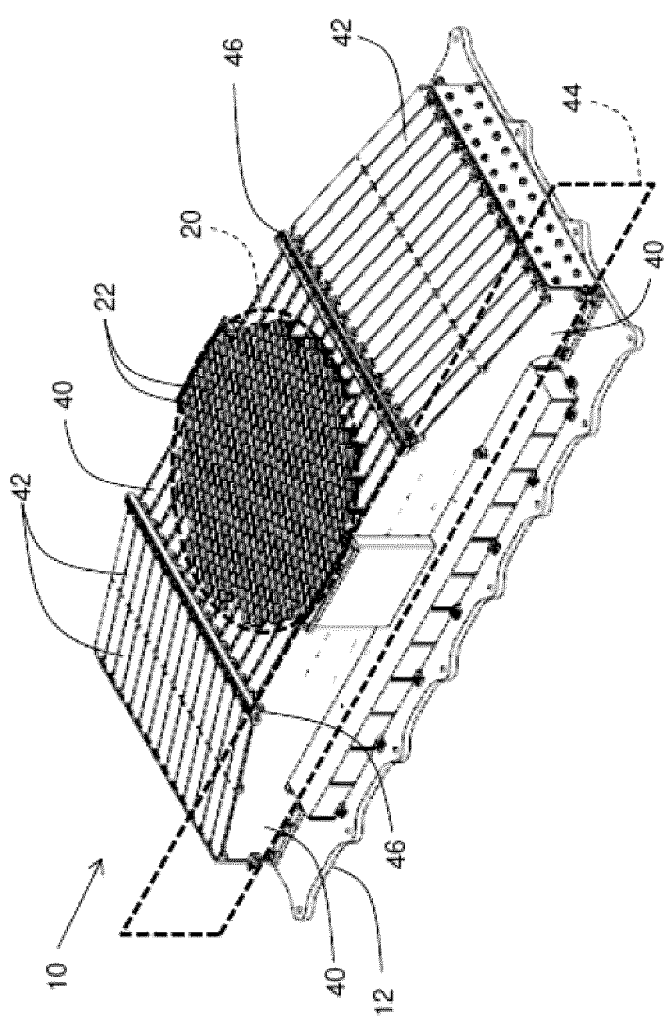
FIG. 14 is a schematic top perspective view of a direct radiating array (DRA) assembly in accordance with an embodiment of the present disclosure.
Figure 15:
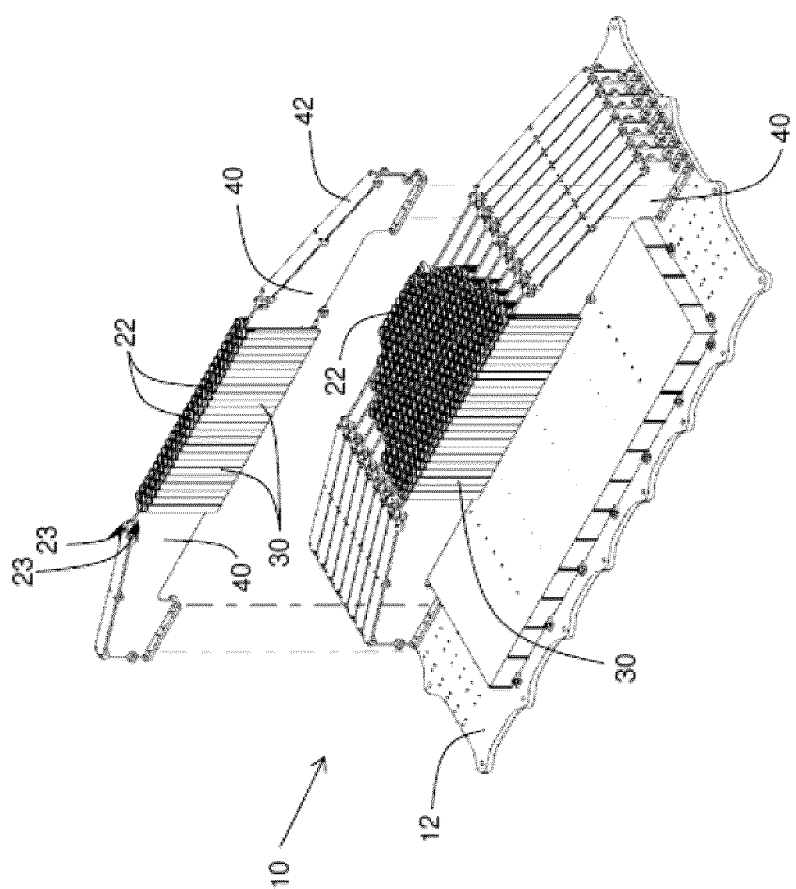
FIG. 15 is an exploded partially broken top perspective view of another embodiment of a DRA assembly of the present disclosure, similar to FIG. 14, showing two adjacent rows of radiating elements being mounted on a thermal sink element.

Referring now to FIGS. 13A and 13B, shown therein are perspective and top views 1300a, 1300b, respectively, of a communications satellite 1310, according to an embodiment. The communications satellite 1310 may be the communication satellite 110 of FIG. 1. The communications satellite 1310 may be a LEO satellite.

The communications satellite 1310 includes a spacecraft 1312. The communications satellite 1310 further includes DRA assemblies 1314a, 1314b, 1314c, and 1314d (referred to collectively as DRA assemblies 1314, and generically as DRA assembly 1314). The DRA assemblies 1314 may be instances of the DRA assembly 510 of FIG. 5. In this particular case, DRA assemblies 1314a, 1314b are Tx antennas and DRA assemblies 1314c, 1314d are Rx antennas.

The DRA assemblies 1314 are mounted on a top surface 1316 of the spacecraft 1312. In particular, the top surface 1316 includes a spacecraft panel to which the DRA assembly 1314 is mounted (e.g. via an interface plate, such as interface plate 544 of FIG. 5). The DRA assemblies 1314 may be under-panel mounted.

The communications satellite 1310 further includes spacecraft heat pipes 1318. The heat pipes 1318 are mounted to a top surface of thermal blades 1320 of the DRA assemblies 1314. The heat pipes 1318 are mounted and arranged generally perpendicular to the configuration of the thermal blades 1320. The spacecraft heat pipes 1318 are mounted to the top surfaces of the thermal blades 1320 on each side of the radiating element active lattice. For example, in communication satellite 1310, six heat pipes 1318 have been mounted to each side of the radiating element active lattice of the DRA assemblies 1314a, 1314b, and three heat pipes 1318 have been mounted to each side of the radiating element active lattice of the DRA assemblies 1314c, 1314d. The heat pipes 1318 may include a flat bottom surface which interfaces with the thermal blades. The heat pipes 1318 are connected to spacecraft panels (e.g. a spacecraft panel on side 1322).

The heat pipes 1318 are mounted to and extend down a side 1322 (e.g. a spacecraft panel thereof) of the spacecraft 1312.

Referring now to FIGS. 14 to 18, there is shown a direct radiating array (DRA) assembly in accordance with an embodiment 10 of the present disclosure, typically for use in antennas onboard of spacecrafts (not shown, but represented by the mounting panel 12 thereof) or the like to transmit and/or receive an electromagnetic RF (radio-frequency) signal of a predetermined signal frequency band.

The DRA assembly 10 includes a plurality of radiating elements 22 defining a radiating surface 20 (shown in stippled line in FIG. 14) of the DRA assembly 10. Each radiating element 22 forms a portion of the radiating surface and defines an element perimeter footprint 24 (see FIGS. 17 and 18) that is in side-by-side arrangement contact with corresponding element footprints 24 of adjacent radiating elements 22. Eventually, although not required, the adjacent radiating elements 22 could be in contact with one another.

The DRA assembly 10 also includes a signal RF chain path 30 (schematically identified as a dotted line located along the different RF chain path components in FIG. 17) for each radiating element 22. Each signal RF chain path 30, typically also referred to as a signal amplification path, is at least partially, but preferably entirely located inside an element volume 26 (see FIG. 17) extending in a direction generally perpendicular to the element footprint 24 of the corresponding radiating element 22 and opposite to a signal radiating direction. The signal amplification path 30 includes, amongst many antenna amplification path components, at least one heat generating unit 32, such as an amplifier unit or the like to amplify the portion of the antenna signal being transmitted to or received from the corresponding radiating element 22.

The DRA assembly 10 further includes a plurality of thermal sink elements 30 40. Each thermal sink element extends inside at least one of the element volumes 26 and connects to a thermal radiator of the spacecraft/satellite or the like, such as a spacecraft mounting panel 12 to transfer heat thereto via a thermal conduction path and/or a local thermal radiating surface mirror 42 (or thermal blade) via heat radiation path. Each amplifier unit 32 mounts on one of the thermal sink elements 40 to transfer its generated heat thereto. The thermal sink elements 40 are adapted to instantaneously and passively transfer or dissipate the generated heat received from the different amplifier 32 mounted thereon to the thermal radiator 12, 42, and passively maintain all amplifier units 32 at a generally uniform temperature relative to one another.

Each thermal sink element 40 has a generally flat blade shape defining a blade plane 44 (shown in stippled lines in FIG. 14) that extends in a blade plane direction generally perpendicular to and below the radiating surface 20. Because of the arrangement of the different thermal sink elements 40 with the radiating elements 22 and their signal amplification paths 30, each thermal sink element 40 also acts as a structural support of the corresponding radiating elements 22 and signal amplification paths 30 mounted thereon, as well as a mechanical alignment device during the assembly of the DRA assembly 10. For better structural behavior of the DRA assembly 10, additional structural supports 46 (see FIG. 14) are also typically used to secure the different thermal sink elements 40 to each another, preferably adjacent the radiating elements 22.

Each thermal sink element 40 is typically a conventional oscillating heat pipe (OHP), also known as a pulsating heat pipe (PHP).

As illustrated in FIG. 18, each signal amplification path 30 is oriented generally perpendicularly relative to the respective radiating element 20. In such a case, the electrical connection could be made via any type of connection/connector 34, including a 90-degree or other RF connection.

As best seen in FIG. 18, the respective geometrical center 24' of the element footprints 24 of two adjacent radiating elements 22 are spaced apart from one another by an element spacing 28. The element spacing 28 may vary based on operating RF frequency and required scan range of the DRA.

Also, each element footprint 24 has a generally symmetrical shape, such as a hexagonal shape (shown in FIGS. 14-18) or the like.

Figure 16:
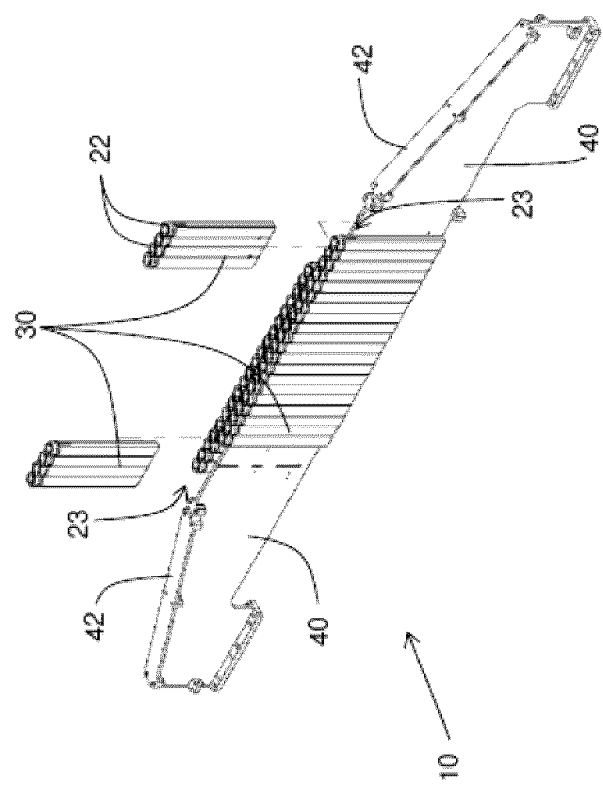
FIG. 16 is an exploded partially broken top perspective view of the two rows of radiating elements mounted on a same thermal heat sink of FIG. 15, showing groups of radiating elements being integrated thereon.

As shown in FIG. 16, the radiating elements 22 are typically arranged in a plurality of rows 23 positioned adjacent one another. The amplifier 32 of the radiating elements 22 of two adjacent rows 23 are typically mounted on one thermal sink element 40, on opposite sides thereof, with the thermal sink element 40 extending in-between the two adjacent rows 23.

As shown in FIGS. 16 to 18, the radiating elements 22, including their respective signal amplification paths 30, are typically arranged in groups (or sets or modules) to ease the assembly thereof, as well as the quick customizing or adaptation of a DRA assembly 10 based on the corresponding antenna requirements (which may require different quantities of radiating elements 22). Different groups or modules, both in number (one, two, three, four, etc.) and arrangement configuration (in line, triangle, square, etc.) of the group radiating elements 22, are contemplated without departing from the scope of the present disclosure.

It is a general object of the present disclosure to provide an improved direct radiating array (DRA) assembly to obviate various problems with existing or conventional DRA antennas.

An advantage of the present disclosure is that the DRA assembly is compact and lightweight, while being especially suitable for a high-power antenna.

Another advantage of the present disclosure is that the DRA assembly allows the heat generated by the amplifier unit of each of the signal amplification paths of the different radiating elements to be efficiently dissipated to a heat sink via a plurality of thermal sink elements, such as oscillating or pulsating heat pipes or the like, that also act as structural elements to support the different electrical components of the antenna.

A further advantage of the present disclosure is that the DRA assembly has a plurality of radiating elements defining a radiating surface of the DRA assembly, and each radiating element has a signal RF chain path, such as a signal amplification path or the like, that is at least partially, and preferably entirely located inside an element volume extending in a direction generally perpendicular to an element footprint of the radiating element and opposite to the radiating surface. It would be obvious that only a portion or some portions of the signal RF chain path could be slightly shifted out of the element volume, depending on design constraints and the like. Typically, the signal amplification path is electrically connected to the radiating element (patch) via an RF connection/connector.

Still another advantage of the present disclosure is that the DRA assembly has a plurality of radiating elements arranged into a plurality of rows adjacent one another, and the signal amplifier of each signal amplification line of all of the radiating element of a same row are typically mounted on a same thermal sink element. Preferably, all of the signal amplifiers of two adjacent rows are mounted on a same thermal sink element positioned there between.

Yet another advantage of the present disclosure is that the DRA assembly includes a plurality of thermal sink elements used to instantaneously and passively (or automatically, as opposed to actively via any electronic and/or electrical controls or the like) transfer the generated heat from each one of the different signal amplifiers mounted thereon to a thermal radiator and passively maintains all of the amplifiers at a generally uniform temperature relative to one another, especially between the radiating elements located at the periphery of the radiating surface and the ones located in the central region thereof (which greatly improves the RF performance of the DRA antenna). The thermal sink elements allow all the active heat sources (including amplifiers) to have an essentially equal direct heat path (same temperature gradient) to the heat sink (thermal radiator or the like). Also, the thermal heat sinks typically act as structural elements to rigidify the DRA assembly, and are also used to mechanically align the different components of the DRA antenna with respect to each other.

Yet a further advantage of the present disclosure is that the thermal sink elements of the DRA assembly are generally planar in shape and extend in a blade plane direction generally perpendicular to and below the DRA radiating surface.

Still a further advantage of the present disclosure is that the radiating 30 surface of the DRA antenna has the respective geometrical center of the element footprints of two adjacent radiating elements that are spaced apart from one another by an element spacing. The element spacing may vary based on operating RF frequency and required scan range of the DRA.

Still another advantage of the present disclosure is that with the DRA assembly function being integrated within the footprint of a radiating element, the design is modular and its overall performance (electrical and mechanical) can be quickly adapted to match the requirements by increasing or decreasing the number of radiating elements.

Yet another advantage of the present disclosure is the DRA assembly compactness, which translates into mass savings. Comparisons with similar performing existing DRA assemblies show a mass saving of as much as 40%.

According to an aspect of the present disclosure there is provided a direct radiating array (DRA) assembly for use in spacecraft antennas to transmit and/or receive an electromagnetic RF signal of a predetermined signal frequency band, said assembly comprising: a plurality of radiating elements defining a radiating surface of the DRA assembly, each said radiating element forming a portion of the radiating surface and defining an element footprint being in side-by-side arrangement with corresponding element footprints of adjacent ones of said plurality of radiating elements; a signal RF chain path for each said radiating element, said signal RF chain path being at least partially located inside an element volume extending in a direction generally perpendicular to the element footprint of the corresponding said radiating element and opposite to a signal radiating direction, said signal RF chain path including at least one heat generating unit; and a plurality of thermal sink elements, each said thermal sink element extending inside at least one of said element volumes and for connecting to a thermal radiator, each said at least one heat generating unit mounting on one of said plurality of thermal sink elements for transferring generated 30 heat thereto, said plurality of thermal sink elements being adapted to instantaneously and passively transfer said generated heat to the thermal radiator and passively maintaining all of said at least one heat generating units at a generally uniform temperature relative to one another.

In one embodiment, each thermal sink element has a generally flat blade shape defining a blade plane, said blade plane extending in a blade plane direction generally perpendicular to and below the radiating surface.

Conveniently, each signal amplification path is oriented generally perpendicularly relative to the respective one of said plurality of radiating elements.

In one embodiment, respective geometrical center of said element footprints of two adjacent ones of said plurality of radiating elements are spaced apart from one another by an element spacing. The element spacing may vary based on operating RF frequency and required scan range of the DRA.

In one embodiment, each element footprint has a generally symmetrical shape, such as preferably a hexagonal shape.

In one embodiment, each thermal sink element is an oscillating heat pipe.

In one embodiment, the plurality of radiating elements are arranged in a plurality of rows positioned adjacent one another, each said at least one heat generating units of corresponding ones of said radiating elements of two adjacent ones of said plurality of rows are mounted on one said thermal sink element, on opposite sides thereof, wherein said one said thermal sink element extending in-between said two adjacent rows.

In one embodiment, the plurality of radiating elements with corresponding said signal RF chain paths are arranged in a plurality of groups positioned adjacent one another.

Conveniently, each group includes at least two of said plurality of radiating elements with corresponding said signal RF chain paths.

Conveniently, for each group, the corresponding said radiating elements and signal RF chain paths are arranged in an in-line configuration relative to one another.

Conveniently, each group includes more than one of said plurality of radiating elements with corresponding said signal RF chain paths.

There is provided herein a direct radiating array assembly for use in spacecraft antennas to transmit and/or receive an electromagnetic RF signal of a predetermined signal frequency band. The assembly includes a plurality of radiating elements defining a radiating surface of the DRA assembly. Each radiating element forms a portion of the radiating surface and defines an element footprint being in side-by-side arrangement with corresponding element footprints of adjacent radiating elements. The assembly also includes a signal RF chain path for each radiating element. The signal RF chain path is at least partially located inside an element volume extending in a direction generally perpendicular to the element footprint of the corresponding radiating element and opposite to a signal radiating direction. The signal RF chain path includes at least one heat generating unit. The DRA assembly also includes a plurality of thermal sink elements. Each thermal sink element extends inside at least one of the element volumes and is for connecting to a thermal radiator. Each heat generating unit is mounted on one of the thermal sink elements for transferring heat to the thermal sink element. The plurality of thermal sink elements are adapted to instantaneously and passively transfer the generated heat to the thermal radiator and passively maintain the heat generating units at a generally uniform temperature relative to one another.

While the above description provides examples of one or more apparatus, methods, or systems, it will be appreciated that other apparatus, methods, or systems may be within the scope of the claims as interpreted by one of skill in the art.

The invention claimed is:

1. A direct radiating array ("DRA") assembly for transmitting or receiving an electromagnetic radio frequency ("RF") signal of at least one predetermined signal frequency band, the DRA assembly comprising:
 a plurality of radiating elements defining a radiating surface of the DRA assembly;
 a plurality of RF signal chain paths, each of the plurality of RF signal chain paths coupled to a respective one of the plurality of radiating elements and configured to amplify an RF signal either received by or to be transmitted by the respective one of the radiating elements; and
 a beamforming network board having a plurality of electrical ports for electrically connecting to the plurality of RF signal chain paths;
 wherein each of the plurality of RF signal chain paths includes a heat generating component, and wherein the DRA assembly further comprises a plurality of thermal blades for passively transferring heat generated by the heat generating component mounted thereto.

2. The DRA assembly of claim 1, wherein the DRA assembly further comprises a heat spreader adapted to passively cool the DRA assembly by transferring heat generated by the heat generating component of the RF signal chain path to a heat sink.

3. The DRA assembly of claim 1, wherein each of the plurality of thermal blades includes a top surface which acts as a thermal exchange interface for the DRA.

4. The DRA assembly of claim 1, wherein each of the plurality of thermal blades includes a heat pipe adapted to actively or passively transfer heat.

5. The DRA assembly of claim 4, wherein the heat pipe is an oscillating heat pipe adapted to passively transfer heat.

6. The DRA assembly of claim 1, wherein each of the plurality of thermal blades is a solid metallic thermal blade adapted to passively transfer heat.

7. The DRA assembly of claim 1, further comprising a plurality of radiating element modules, wherein each respective one of the plurality of radiating element modules includes a subset of the plurality of radiating elements and a subset of the plurality of RF signal chain paths, wherein the subset of the plurality of radiating elements defines a collective radiating element footprint, and wherein the subset of the plurality of RF signal chain paths is contained within the collective radiating element footprint.

8. The DRA assembly of claim 1, further comprising a plurality of system-in-package ("SIP") modules each including at least one beamforming integrated circuit ("BFIC"), the SIP modules mounted to the beamforming network board in a planar configuration.

9. The DRA assembly of claim 8, wherein a first subset of the plurality of SIP modules is mounted to a first surface of the beamforming network board and a second subset of the plurality of SIP modules is mounted to a second surface of the beamforming network board, the first and second surfaces opposing one another.

10. The DRA assembly of claim 8, wherein the plurality of SIP modules are mounted to the beamforming network board as a plurality of double stacks, each double stack including a first SIP module mounted to a first surface of the beamforming network board and a second SIP module mounted to a second surface of the beamforming network board opposing the first surface, the first and second SIP modules connected to one another.

11. The DRA assembly of claim 10, wherein each double stack is thermally coupled to a thermal blade adapted to passively transfer heat.

12. The DRA assembly of claim 9, wherein each of the first subset of the SIP modules is thermally coupled to a thermal blade adapted to passively transfer heat.

13. The DRA assembly of claim 10, wherein the beamforming network board is mounted to a baseplate, and wherein each double stack is thermally coupled to the baseplate for transferring heat from a heat generating component of the double stack to a thermal blade adapted to passively transfer heat.

14. The DRA assembly of claim 1, wherein each RF signal chain path is connected to the beamforming network board via a spring-loaded electrical connector.

15. The DRA assembly of claim 1, further comprising a plurality of system-in-package ("SIP") modules mounted to the beamforming network board, each SIP module including at least one beamforming integrated circuit ("BFIC") and a spring-loaded electrical connector for electrically connecting the SIP module to the beamforming network board.

16. The DRA assembly of claim 1, wherein the beamforming network board defines a first plane and the plurality of RF signal chain paths are arranged in a second plane that is substantially perpendicular to the first plane.

17. The DRA assembly of claim 1, further comprising a plurality of thermal blades mounted substantially perpendicular to the beamforming network board, the plurality of RF signal chain paths mounted to the plurality of thermal blades.

18. A satellite comprising the DRA assembly of claim 1.

19. The satellite of claim 18, wherein the satellite is a low-earth orbit satellite.

* * * * *